(12) United States Patent
Kissell

(10) Patent No.: US 7,694,304 B2
(45) Date of Patent: Apr. 6, 2010

(54) MECHANISMS FOR DYNAMIC CONFIGURATION OF VIRTUAL PROCESSOR RESOURCES

(75) Inventor: Kevin D Kissell, Le Bar sur Loup (FR)

(73) Assignee: MIPS Technologies, Inc., Sunnyvale, CA (US)

(*) Notice: Subject to any disclaimer, the term of this patent is extended or adjusted under 35 U.S.C. 154(b) by 1571 days.

(21) Appl. No.: 10/929,102

(22) Filed: Aug. 27, 2004

(65) Prior Publication Data

US 2005/0125629 A1    Jun. 9, 2005

Related U.S. Application Data

(63) Continuation-in-part of application No. 10/684,350, filed on Oct. 10, 2003, now Pat. No. 7,376,954, and a continuation-in-part of application No. 10/684,348, filed on Oct. 10, 2003.

(60) Provisional application No. 60/499,180, filed on Aug. 28, 2003, provisional application No. 60/502,358, filed on Sep. 12, 2003, provisional application No. 60/502,359, filed on Sep. 12, 2003.

(51) Int. Cl.
*G06F 9/46* (2006.01)
*G06F 15/76* (2006.01)
(52) U.S. Cl. .................. 718/104; 718/100; 712/31
(58) Field of Classification Search ................ 718/100, 718/102, 104; 712/31
See application file for complete search history.

(56) References Cited

U.S. PATENT DOCUMENTS 4,817,051 A    3/1989  Chang 4,860,190 A    8/1989  Kaneda et al.

(Continued)

FOREIGN PATENT DOCUMENTS

EP    0725334 A1    8/1996

(Continued)

OTHER PUBLICATIONS

English Abstract of Japanese Patent Publication No. 8-249195, published Sep. 27, 1996, 1 page.*

(Continued)

*Primary Examiner*—Meng-Ai An
*Assistant Examiner*—Caroline Arcos
(74) *Attorney, Agent, or Firm*—Sterne, Kessler, Goldstein & Fox P.L.L.C.

(57) ABSTRACT

Mechanisms for dynamically configuring the resources of a virtual multiprocessor are provided. An apparatus to configure resources for virtual processing elements in a virtual multiprocessor is provided. The apparatus includes a virtual multiprocessor context, virtual processing element contexts, and configuration logic. The virtual multiprocessor context, prescribes the resources, and controls a configuration state of the virtual multiprocessor. The virtual processing element contexts each exclusively correspond to a virtual processing element. The virtual processing element contexts each have first logic, for prescribing whether the virtual processing element is permitted to configure the resources; and second logic, for prescribing a subset of the resources that is allocated to the virtual processing element. The configuration logic detects whether the virtual processing element is permitted to configure the resources, updates the virtual multiprocessor context to direct the virtual multiprocessor enter the configuration state, and configures the resources by updating a prescribed virtual processing element context.

58 Claims, 12 Drawing Sheets

U.S. PATENT DOCUMENTS

| | | | |
|---|---|---|---|
| 5,148,538 A * | 9/1992 | Celtruda et al. | 711/205 |
| 5,159,686 A | 10/1992 | Chastain et al. | |
| 5,247,694 A * | 9/1993 | Dahl | 712/13 |
| 5,301,298 A * | 4/1994 | Kagan et al. | 711/141 |
| 5,499,349 A | 3/1996 | Nikhil et al. | |
| 5,511,192 A * | 4/1996 | Shirakihara | 718/106 |
| 5,515,538 A | 5/1996 | Kleiman | |
| 5,659,786 A | 8/1997 | George et al. | |
| 5,758,142 A | 5/1998 | McFarling et al. | |
| 5,784,589 A * | 7/1998 | Bluhm | 712/217 |
| 5,799,188 A | 8/1998 | Manikundalam et al. | |
| 5,812,811 A | 9/1998 | Dubey et al. | |
| 5,812,830 A * | 9/1998 | Naaseh-Shahry et al. | 713/400 |
| 5,867,704 A | 2/1999 | Tanaka et al. | |
| 5,892,934 A | 4/1999 | Yard | |
| 5,923,892 A * | 7/1999 | Levy | 712/31 |
| 5,933,627 A | 8/1999 | Parady | |
| 5,944,816 A | 8/1999 | Dutton et al. | |
| 5,949,994 A | 9/1999 | Dupree et al. | |
| 5,961,584 A | 10/1999 | Wolf | |
| 6,014,737 A * | 1/2000 | Kurata | 712/219 |
| 6,061,710 A | 5/2000 | Eickemeyer et al. | |
| 6,067,608 A * | 5/2000 | Perry | 711/203 |
| 6,088,787 A | 7/2000 | Predko | |
| 6,128,641 A * | 10/2000 | Fleck et al. | 718/108 |
| 6,128,720 A | 10/2000 | Pechanek et al. | |
| 6,175,916 B1 | 1/2001 | Ginsberg et al. | |
| 6,189,064 B1 * | 2/2001 | MacInnis et al. | 710/244 |
| 6,189,093 B1 * | 2/2001 | Ekner et al. | 712/244 |
| 6,205,543 B1 | 3/2001 | Tremblay et al. | |
| 6,223,228 B1 | 4/2001 | Ryan et al. | |
| 6,286,027 B1 | 9/2001 | Dwyer, III et al. | |
| 6,330,656 B1 * | 12/2001 | Bealkowski et al. | 712/13 |
| 6,330,661 B1 | 12/2001 | Torii | |
| 6,401,155 B1 | 6/2002 | Saville et al. | |
| 6,591,379 B1 | 7/2003 | LeVine et al. | |
| 6,643,759 B2 | 11/2003 | Andersson et al. | |
| 6,668,308 B2 * | 12/2003 | Barroso et al. | 711/141 |
| 6,671,791 B1 * | 12/2003 | McGrath | 711/206 |
| 6,675,192 B2 | 1/2004 | Emer et al. | |
| 6,687,812 B1 | 2/2004 | Shimada | |
| 6,697,935 B1 | 2/2004 | Borkenhagen et al. | |
| 6,738,796 B1 | 5/2004 | Mobini | |
| 6,779,065 B2 * | 8/2004 | Murty et al. | 710/260 |
| 6,877,083 B2 | 4/2005 | Arimilli et al. | |
| 6,889,319 B1 | 5/2005 | Rodgers et al. | |
| 6,920,634 B1 | 7/2005 | Tudor | |
| 6,922,745 B2 | 7/2005 | Kumar et al. | |
| 6,971,103 B2 | 11/2005 | Hokenek et al. | |
| 6,986,140 B2 * | 1/2006 | Brenner et al. | 718/105 |
| 6,993,598 B2 | 1/2006 | Pafumi et al. | |
| 7,020,879 B1 | 3/2006 | Nemirovsky et al. | |
| 7,065,094 B2 * | 6/2006 | Petersen et al. | 370/401 |
| 7,069,421 B1 | 6/2006 | Yates, Jr. et al. | |
| 7,073,042 B2 * | 7/2006 | Uhlig et al. | 711/207 |
| 7,093,106 B2 * | 8/2006 | Ambekar et al. | 712/217 |
| 7,127,561 B2 | 10/2006 | Hill et al. | |
| 7,134,124 B2 | 11/2006 | Ohsawa et al. | |
| 7,152,170 B2 * | 12/2006 | Park | 713/320 |
| 7,181,600 B1 * | 2/2007 | Uhler | 712/229 |
| 7,185,183 B1 * | 2/2007 | Uhler | 712/224 |
| 7,185,185 B2 | 2/2007 | Joy et al. | |
| 7,203,823 B2 | 4/2007 | Albuz et al. | |
| 7,216,338 B2 | 5/2007 | Barnett et al. | |
| 7,321,965 B2 | 1/2008 | Kissell | |
| 7,376,954 B2 | 5/2008 | Kissell | |
| 7,424,599 B2 | 9/2008 | Kissell | |
| 7,428,732 B2 * | 9/2008 | Sandri et al. | 718/104 |
| 2002/0083173 A1 | 6/2002 | Musoll et al. | |
| 2002/0083278 A1 | 6/2002 | Noyes | |
| 2002/0091915 A1 | 7/2002 | Parady | |
| 2002/0103847 A1 * | 8/2002 | Potash | 709/107 |
| 2002/0147760 A1 | 10/2002 | Torii | |
| 2002/0174318 A1 * | 11/2002 | Stuttard et al. | 712/13 |
| 2003/0014471 A1 | 1/2003 | Ohsawa et al. | |
| 2003/0074545 A1 | 4/2003 | Uhler | |
| 2003/0079094 A1 | 4/2003 | Rajwar et al. | |
| 2003/0093652 A1 | 5/2003 | Song | |
| 2003/0105796 A1 * | 6/2003 | Sandri et al. | 709/104 |
| 2003/0115245 A1 | 6/2003 | Fujisawa | |
| 2003/0126416 A1 | 7/2003 | Marr et al. | |
| 2003/0225816 A1 * | 12/2003 | Morrow et al. | 709/107 |
| 2004/0015684 A1 | 1/2004 | Peterson | |
| 2004/0139306 A1 | 7/2004 | Albuz et al. | |
| 2005/0050305 A1 | 3/2005 | Kissell | |
| 2005/0050395 A1 | 3/2005 | Kissell | |
| 2005/0120194 A1 | 6/2005 | Kissell | |
| 2005/0125795 A1 | 6/2005 | Kissell | |
| 2005/0240936 A1 | 10/2005 | Jones et al. | |
| 2005/0251613 A1 | 11/2005 | Kissell | |
| 2005/0251639 A1 | 11/2005 | Kissell et al. | |
| 2006/0161421 A1 | 7/2006 | Kissell | |
| 2006/0161921 A1 | 7/2006 | Kissell | |
| 2006/0190945 A1 | 8/2006 | Kissell | |
| 2006/0190946 A1 | 8/2006 | Kissell | |
| 2006/0195683 A1 | 8/2006 | Kissell | |
| 2006/0206686 A1 | 9/2006 | Banerjee et al. | |
| 2007/0043935 A2 | 2/2007 | Kissell | |
| 2007/0044105 A2 | 2/2007 | Kissell | |
| 2007/0044106 A2 | 2/2007 | Kissell | |
| 2007/0106887 A1 | 5/2007 | Kissell | |
| 2007/0106988 A1 | 5/2007 | Kissell | |
| 2007/0106989 A1 | 5/2007 | Kissell | |
| 2007/0106990 A1 | 5/2007 | Kissell | |
| 2007/0186028 A2 | 8/2007 | Kissell | |
| 2008/0140998 A1 | 6/2008 | Kissell | |

FOREIGN PATENT DOCUMENTS

| | | | |
|---|---|---|---|
| EP | 0917057 A2 | | 5/1999 |
| EP | 1089173 A2 | | 9/1999 |
| JP | 8-249195 A | | 9/1996 |
| JP | 2007-504536 | | 3/2007 |
| WO | WO 01/53935 | * | 7/2001 |
| WO | WO0153935 A | | 7/2001 |
| WO | WO 03/019360 A2 | | 3/2003 |
| WO | WO 2005/022385 A1 | | 3/2005 |

OTHER PUBLICATIONS

Zilles, Craig B. et al. "The Use of Multithreading for Exception Handling." *micro*, p. 219. 32nd Annual International Symposium on Microarchitecture.

Dorai, Gautham K. et al. "Transparent Threads: Resource Sharing in SMT Processors for High Single-Thread Performance." Proceedings of the International Conference on Parallel Architectures and Compilation Techniques 2002.

Alverson et al., "Tera Hardware-Software Cooperation," Tera Computer Corporation—Proceedings of the IEEE/ACM SC97 Conference—Nov. 15-21, 1997, San Jose, CA.

Carter et al., "Performance and Programming Experience on the Tera MTA," Tera Computer Corporation—SIAM Conference on Parallel Processing—Mar. 1999.

Marr et al, Intel Technology Journal, Feb. 14, 2002, vol. 6, No. 1, Intel Corporation, USA.

MIPS32™ Architecture for Programmers vol. II The MIPS32™ Instruction Set. Revision 2.00. pp. 231 & 311. Document No. MD0086. Jun. 9, 2003. MIPS Technologies, Inc.

Patterson et al. "Computer Organization & Design: The Hardware/Software Interface." 1998. Morgan Kaufmann Publishers, Inc. Second Edition. pp. 592-593.

Silberschatz et al. "Operating Systems Concepts." 1994. Addison-Wesley Publishing Company. Fourth Edition. pp. 267-269, 271-272, 275.

Heuring, Vincent P. and Jordan, Harry F. "Computer Systems and Architecture." Reading, Mass.: Addison Wesley Longman, Inc., © 1997. pp. 35-37.

Sunsoft, "Multithreaded Programming Guide," 1995, Sunsoft, A Sun Micorsystems, Inc. Business, Mountainview, CA.

Engelschall, R.S., "pth GNU Portable Threads," Pth Manual, Online! Feb. 17, 2003, pp. 1-31, XP002315713.

Ishihara et al., "A Comparison of Concurrent Programming and Cooperative Multithreading," Euro-Par 2000 Parallel Processing. 6th International Euro-Par Conference. Proceedings (Lecture Notes in Computer Science vol. 1900) Springer-Verlag Berlin, Germany, Sep. 1, 2000, pp. 729-738, XP002315714, ISBN: 3-540-67956-1.

Frees, W., "Teilzeitarbeit Im Prozessor," Electronik, Franzis Verlag GMBH. Munche, DE, vol. 45, No. 9, Apr. 30, 1996, pp. 100-106, XP000595386, ISSN: 0013-5658 (English-language version of the search report or action which indicates the degree of relevance found by the foreign office is appended.).

Scheidhauer, Ralf, "Design, Implementierung und Evaluierung einer virtuellen Maschine fur Oz," Online!, Dec. 1998, Dissertation, Saarbrucken, (English-language version of the search report or action which indicates the degree of relevance found by the foreign office is appended.).

Mehl et al., "An Abstract Machine for Oz," Research Report RR-95-08, Online!, Jun. 1995, pp. 1-23, Kaiserslautern Saarbrucken, ISSN 0946-008.

Unger et al., "Utilising Parallel Resources by Speculation," Parallel and Distributed Processing, 1999. PDP '99. Proceedings of the Seventh Euromicro Workshop on Funchal, Portugal Feb. 3-5, 1999, Los Alamitos, CA, USA, IEEE Computing Society, Feb. 3, 1999, pp. 339-343.

Tsai et al: "The Superthreaded Architecture: Thread Pipelining with Run-Time Data Dependence Checking and Control Speculation," Parallel Architectures and Compiliation Techniques, 1996, Proceedings of the 1996 Conference in Boston, MA, USA, Oct. 20-23, 1996, Los Alamitos, CA, USA, IEEE Comput. Soc., Oct. 20, 1996, pp. 35-46.

Popov, Konstantin: "A Parallel Abstract Machine for the Thread-Based Concurrent Language Oz," Workshop on Parallism and Implementation of Technology for Constraint Logic Programming Languages, Sep. 1997, pp. 1-25.

Bolychevsky et al. "Dynamic Scheduling in RISC Architectures." IEEE Proceedings Computers and Digital Techniques, vol. 143, No. 5. Sep. 24, 1996. pp. 309-317.

Sunsoft. Multithreaded Programming Guide. 1994. Sunsoft, A Sun Microsystems, Inc. Business. Mountainview, CA. pp. 6, 12-13, 22-34 and 87.

Theo Ungerer, University of Augsburg, Augsburg Germany; Borut Robic, University of Ljubljana, Slovenia; Jurij Silc, Jozef Stefan Institute, Slovenia. "Multithreaded Program Guide", Nov. 1995. Sunsoft, A Sun Microsystems, Inc. Business, 2550 Garcia Ave., Mountain View, CA, 94043, USA.

Theo Ungerer, University of Augsburg, Augsburg Germany; Borut Robic, University of Ljubljana, Slovenia; Jurij Silc, Jozef Stefan Institute, Slovenia. "A Survey of Processors with Explicit Multithreading". ACM Computing Surveys, vol. 35, No. 1, Mar. 2003, pp. 29-63.

David Fotland; "A Multithreaded Wireless Network Processor with Software I/O". Embedded Processor Forum, Jun. 18, 2003. In-Stat MDR;www.MDRonline.com.

Ubicom, Inc., A Next-Generation Packet Processor for Wireless Networking, Apr. 15, 2003, Ubicom, Inc., Mountain View, CA.

Hennessy, John L. et al. "Computer Architecture A Quantitative Approach." Second Edition. San Francisco, CA: Morgan Kaufmann Publishers, Inc. 1996. pp. 70-73 and 87-89.

Kissell, Kevin D. "Microprocessor Forum (MPF) Conference Program Presentation: Architectural Extensions to the MIPS Architecture for High-Performance Embedded Systems." Oct. 15, 2003.

(Webpage) Cray MTA-2 Historical Technical Papers, http://www.cray.com/products/programs/mta_2/resources.html. (Mar. 12, 2005). (formerly http://www.cray.com/products/systems/mta/psdocs.html (Jul. 2, 2004))

Zaslavsky, Leonid et al. "A Scalable Approach for Solving Irregular Sparse Linear Systems on the Tera MTA Multithreaded Parallel Shared-Memory." Ninth SIAM Conference on Parallel Processing for Scientific Computing, San Antonio, TX. Mar. 1999.

Briggs, Preston. "Tuning the BLAS for the Tera." Workshop on Multithreaded Execution, Architecture and Compilation. (MTEAC 98). Jan. 1998.

Alverson, Gail et al., "Scheduling on the Tera MTA" IPPS '95 Workshop on Job Scheduling Strategies for Parallel Processing, Santa Barbara, CA, Apr. 1995, and in D.G.Feitelson and L. Rudolph, editors, Job Scheduling Strategies for Parallel Processing, Lecture Notes in Computer Science vol. 949, pp. 19-44, Springer-Verlag 1995.

Smith, Burton. "Folklore and Reality in High Performance Computing Slide Presentation." 1995.

Smith, Burton. "The Quest for General-Purpose Parallel Computing." 1994.

Alverson, Gail et al. "Exploiting Heterogeneous Parallelism on a Multithreaded Multiprocessor." 6th ACM International Conference on Supercomputing, Washington DC, Jul. 1992.

Callahan, David. "Recognizing and Parallelizing Bounded Recurrences." Fourth Workshop on Languages and Compilers for Parallel Computing. pp. 169-184. Aug. 1991.

Callahan, David et al. "Register Allocation via Hierarchical Graph Coloring." ACM SIGPLAN '91 Conference on Programming Language Design and Implementation, Jun. 1991.

Alverson, Robert. "Integer Division Using Reciprocals." 10th IEEE Symposium on Computer Arithmetic. Jun. 1991.

Callahan, David et al. "Improving Register Allocation for Subscripted Variables." ACM SIGPLAN Conference on Programming Language Design and Implementation, Jun. 1990.

Alverson, Robert et al. "The Tera Computer System." ACM International Conference at Supercomputing, pp. 1-6, Jun. 1990.

Smith, Burton. "The End of Architecture." Keynote Address, 17th Annual Syrnposium on Computer Architecture, Seattle, Washington, May 1990.

Alverson, Gail et al. "A Future-Based Parallel Language for a General Purpose Highly Parallel Computer." Languages and Compilers for Parallel Computing. pp. 95-113, MIT Press, Cambridge, Massachusetts, 1990.

"MIT Alewife Project: Home Page." retrieved from URL: http://catfish.csail.mit.edu/alewife/ on Jul. 2, 2004.

Arvind and R.A. Innaucci. "Two Fundamental Issues in Multiprocessing." In Proc. of DFVLF-Conf. 1987 on Par.Proc.in. Science and Eng., Bonn-Bad Godesbert, W. Germany, Jun. 1987.

Agarwal, A. et al., "APRIL: A Processor Architecture for Multiprocessing," *ACM SIGARCH Computer Architecture News*, vol. 18, Issue 3a, pp. 104-114, Jun. 1990.

Culler, D.E. et al., *Two Fundamental Limits on Dataflow Multiprocessing*, Report No. UCB/CSD 92/716, pp. 1-14, 1993.

English Translation of Notice of Rejection for Japanese Patent Application No. 2006-524900, dated Nov. 28, 2008, 4 pages.

English Translation of Notice of Rejection for Japanese Patent Application No. 2006-524929, dated Nov. 28, 2008, 4 pages.

English Translation of Notice of Rejection for Japanese Patent Application No. 2006-524961, dated Nov. 28, 2008, 3 pages.

English Abstract of Japanese Patent Publication No. 2007-504536, published September Mar. 1, 2007, 1 page.

*Exception Handler*, from Free Online Dictionary of Computing, 1 page, Oct. 31, 1994.

Kane, G. and Heinrich, J., *MIPS RISC Architecture*, Prentice Hall, Upper Saddle River, New Jersey, 1992. (entire book submitted).

Kissell, K.D., "MIPS MT: A Multithreaded RISC Architecture for Embedded Real-Time Processing," *High Performance Embedded Architectures and Compilers*, Spring, vol. 4917/2008, pp. 9-21, 2008.

Kwak, H. et al., "Effects of Multithreading on Cache Performance," *IEEE Transaction on Computers*, IEEE, vol. 48, Issue 2, pp. 176-184, Feb. 1999.

Lee, B. et al., "Simulation Study of Multithreaded Virtual Processor," *IASTED International Conference on Parallel and Distributed Systems (Euro-PDS)*, pp. 1-6, Jul. 3, 1998.

*MIPS32® Architecture for Programmers, vol. III: The MIPS32® Privileged Resource Architecture*, Revision 2.50, Jul. 1, 2005, MIPS Technologies, Inc., 137 pages.

*MIPS32® Architecture for Programmers, vol. IV-f: The MIPS® MT Application-Specific Extension to the MIPS32® Architecture*, Revision 1.00, Sep. 28, 2005, MIPS Technologies, Inc., 83 pages.

Sweetman, D., *See MIPS Run*, Morgan Kaufmann Publishers, San Francisco, CA (2002). (entire book submitted).

Teller et al., "Locating Multiprocessor TLBs at Memory," Proc. of the Twenty-Seventh Annual Hawaii International Conference on System Sciences, *IEEE*, pp. 554-563, 1994.

Thiébaut, D. et al., "Improving Disk Cache Hit-Ratios Through Cache Partitioning," *IEEE Transactions on Computers*, vol. 41, No. 6, pp. 665-676, 1992.

Office Communication, dated Apr. 9, 2007, for U.S. Appl. No. 10/928,746, filed Aug. 27, 2004, 28 pages.

Office Communication, dated Oct. 23, 2007, for U.S. Appl. No. 10/928,746, filed Aug. 27, 2004, 27 pages.

Office Communication, dated Apr. 21, 2008, for U.S. Appl. No. 10/928,746, filed Aug. 27, 2004, 29 pages.

Office Communication, dated Jan. 22, 2009, for U.S. Appl. No. 10/928,746, filed Aug. 27, 2004, 31 pages.

Office Communication, dated Jun. 21, 2007, for U.S. Appl. No. 10/929,097, filed Aug. 27, 2004, 18 pages.

Office Communication, dated Oct. 12, 2006, for U.S. Appl. No. 10/929,342, filed Aug. 27, 2004, 26 pages.

Office Communication, dated Mar. 22, 2007, for U.S. Appl. No. 10/929,342, filed Aug. 27, 2004, 22 pages.

Office Communication, dated Apr. 6, 2007, for U.S. Appl. No. 10/954,988, filed Sep. 30, 2004, 8 pages.

Office Communication, dated Jan. 9, 2008, for U.S. Appl. No. 10/954,988, filed Sep. 30, 2004, 9 pages.

Office Communication, dated Jul. 29, 2008, for U.S. Appl. No. 10/954,988, filed Sep. 30, 2004, 8 pages.

Office Communication, dated Mar. 5, 2009, for U.S. Appl. No. 10/954,988, filed Sep. 30, 2004, 5 pages.

Office Communication, dated Dec. 19, 2006, for U.S. Appl. No. 10/955,231, filed Sep. 30, 2004, 19 pages.

Office Communication, dated Aug. 9, 2007, for U.S. Appl. No. 10/955,231, filed Sep. 30, 2004, 23 pages.

Office Communication, dated Mar. 6, 2007, for U.S. Appl. No. 11/330,914, filed Jan. 11, 2006, 21 pages.

Office Communication, dated Jul. 20, 2007, for U.S. Appl. No. 11/330,914, filed Jan. 11, 2006, 27 pages.

Office Communication, dated May 15, 2008, for U.S. Appl. No. 11/615,960, filed Dec. 23, 2006, 17 pages.

Office Communication, dated Dec. 8, 2008, for U.S. Appl. No. 11/615,960, filed Dec. 23, 2006, 15 pages.

Office Communication, dated Apr. 10, 2009, for U.S. Appl. No. 11/615,960, filed Dec. 23, 2006, 16 pages.

Office Communication, dated Oct. 17, 2008, for U.S. Appl. No. 11/615,963, filed Dec. 23, 2006, 16 pages.

Office Communication, dated Apr. 3, 2009, for U.S. Appl. No. 11/615,963, filed Dec. 23, 2006, 15 pages.

Office Communication, dated Oct. 15, 2008, for U.S. Appl. No. 11/615,964, filed Dec. 23, 2006, 18 pages.

Office Communication, dated Apr. 13, 2009, for U.S. Appl. No. 11/615,964, filed Dec. 23, 2006, 16 pages.

Office Communication, dated Oct. 16, 2008, for U.S. Appl. No. 11/615,965, filed Dec. 23, 2006, 17 pages.

Office Communication, dated Apr. 9, 2009, for U.S. Appl. No. 11/615,965, filed Dec. 23, 2006, 16 pages.

Office Communication, dated Dec. 22, 2008, for U.S. Appl. No. 11/949,603, filed Dec. 3, 2007, 8 pages.

* cited by examiner

FIG. 4

VIRTUAL MULTIPROCESSING CONTEXT REGISTERS

⟵ 400

| REGISTER | CONTEXT | CP0 REGISTER NUMBER | REGISTER SELECT NUMBER | DESCRIPTION |
|---|---|---|---|---|
| MVPCONTROL | VMP | 0 | 1 | PER-PROCESSOR REGISTER CONTAINING GLOBAL MULTITHREADING CONFIGURATION DATA |
| MVPCONF0 | VMP | 0 | 2 | PER-PROCESSOR MULTI-VPE DYNAMIC CONFIGURATION INFORMATION |
| MVPCONF1 | VMP | 0 | 3 | PER-PROCESSOR MULTI-VPE DYNAMIC CONFIGURATION INFORMATION |
| VPECONTROL | VPE | 1 | 1 | PER-VPE REGISTER CONTAINING THREAD CONFIGURATION DATA |
| VPECONF0 | VPE | 1 | 2 | PER-VPE MULTI-THREAD CONFIGURATION INFORMATION |
| VPECONF1 | VPE | 1 | 3 | PER-VPE MULTI-THREAD CONFIGURATION INFORMATION |
| VPESCHEDULE | VPE | 1 | 5 | PER-VPE REGISTER TO MANAGE SCHEDULING OF A VPE WITHIN A PROCESSOR |

FIG. 5A

MVPCONTROL REGISTER

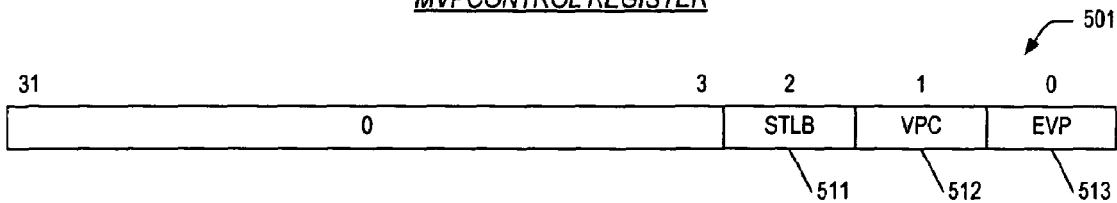

| Fields | | Description | Read/Write | Reset State |
|---|---|---|---|---|
| Name | Bits | | | |
| STLB | 2 | Share TLBs. Modifiable only if the VPC bit was set prior to the write to the register of a new value. When set, the full compliment of TLBs of a processor is shared by all VPEs on the processor, regardless of the programming of the Config1.MMU_Size register fields.<br><br>When STLB is set:<br>• The virtual address and ASID spaces are unified across all VPEs sharing the TLB.<br>• The TLB logic must ensure that a TLBWR instruction can never write to a TLB entry which corresponds to the valid Index register value of any VPE sharing the TLB.<br>• The creation of duplicate TLB entries is silently suppressed instead of generating a Machine Check exception.<br>• TLBWRs may have UNPREDICTABLE results if there are fewer total unwired TLB entries than there are operational VPEs sharing the TLB.<br>• TLBWRs may have UNPREDICTABLE results if the Wired register values are not identical across all VPEs sharing the TLB.<br><br>For correct software operation, it is recommended that all MMU_Size fields be set to the size of the shared TLB when STLB is set. When not in use for TLB maintenance, software should leave the Index register of each VPE set to an invalid value, with the P bit set. | R/RW | 0 |
| VPC | 1 | Indicates that Processor is in a VPE Configuration State. When VPC is set, some normally "Preset" configuration register fields become writable, to allow for dynamic configuration of processor resources.<br><br>Settable by software only if the VPEConf0.MVP bit is also set for the VPE issuing the modifying instruction, the VPC bit may be cleared regardless of the MVP state, allowing the processor to de-configure its own MVP capability.<br><br>Processor behavior is UNDEFINED if VPC and EVP are both in a set state at the same time. | R/RW | 0 |
| EVP | 0 | Enable Virtual Processors. Modifiable only if the VPEConf0.MVP bit is set for the VPE issuing the modifying instruction. Set by EVPE instruction and cleared by DVPE instruction. If set, all activated VPEs on a processor fetch and execute independently. If cleared, only a single instruction stream on a single VPE can run. | R/RW | Preset |
| 0 | 31:3 | Must be written as zero; return zero on read. | 0 | 0 |

FIG. 5B

MVPCONF0 REGISTER

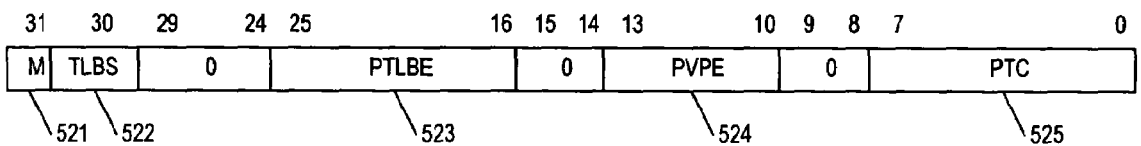

| FIELDS | | DESCRIPTION | READ/ WRITE | RESET STATE |
|---|---|---|---|---|
| NAME | BITS | | | |
| M | 31 | THIS BIT IS RESERVED TO INDICATE THAT A *MVPCONF1* REGISTER IS PRESENT. IF THE *MVPCONF1* REGISTER IS NOT IMPLEMENTED, THIS BIT SHOULD READ AS A 0. IF THE *MVPCONF1* REGISTER IS IMPLEMENTED, THIS BIT SHOULD READ AS A 1. | R | PRESET |
| TLBS | 30 | TLB SHARABLE. INDICATES THAT TLB SHARING AMONGST ALL VPES OF A VMP IS POSSIBLE. TLB SHARING IS ENABLED BY THE *STLB* BIT OF THE *MVPCONTROL* REGISTER. | | |
| PTLBE | 25:16 | TOTAL PROCESSOR COMPLIMENT OF ALLOCATABLE TLB ENTRY PAIRS. | R | PRESET |
| PVPE | 29:26 | TOTAL PROCESSOR COMPLIMENT OF VPE CONTEXTS - 1 | R | PRESET |
| PTC | 7:0 | TOTAL PROCESSOR COMPLIMENT OF TCS - 1 | R | PRESET |
| 0 | 30:26, 15:14, 9:8 | RESERVED. READS AS ZERO, MUST BE WRITTEN AS ZERO. | R | 0 |

FIG. 5D

VPECONTROL REGISTER

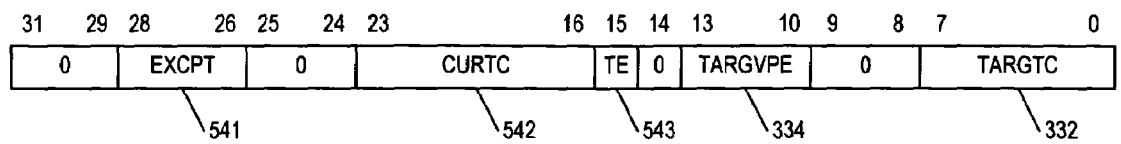

| FIELDS | | DESCRIPTION | | | READ/ WRITE | RESET STATE |
|---|---|---|---|---|---|---|
| NAME | BITS | | | | | |
| EXCPT | 28:26 | EXCEPTION CODE OF MOST RECENTLY DISPATCHED THREAD EXCEPTION | VALUE | MEANING | R | 0 |
| | | | 0 | THREAD UNDERFLOW | | |
| | | | 1 | THREAD OVERFLOW | | |
| | | | 2 | INVALID YIELD QUALIFIER | | |
| | | | 3 | GATING STORAGE EXCEPTION | | |
| | | | 4-7 | RESERVED | | |
| CURTC | 23:16 | INDICATES THE NUMBER (INDEX) OF THE TC OF THE THREAD ISSUING THE MFC0 INSTRUCTION INSPECTING THE REGISTER. WHEN VPECONTROL IS INSPECTED VIA AN MFTR INSTRUCTION, THE VALUE REPRESENTS THE LAST TC TO HAVE ISSUED AN INSTRUCTION, AS OF SOME IMPLEMENTATION-DEPENDENT PREVIOUS CYCLE. | | | R | PRESET, TYPICALLY SAME VALUE AS MINTC FIELD OF VPECONF0 |
| TE | 15 | THREADS ENABLED. SET BY EMT INSTRUCTION, CLEARED BY DMT INSTRUCTION. IF SET, MULTIPLE TCS MAY BE SIMULTANEOUSLY ACTIVE. IF CLEARED, ONLY ONE THREAD MAY EXECUTE ON THE VPE. | | | R/W | 0 |
| TARGVPE | 13:10 | VPE NUMBER TO BE USED ON MTTR AND MFTR INSTRUCTIONS WHEN THE MVP BIT OF MVPCONTROL REGISTER IS SET. IF MVP IS NOT SET, TARGVPE IS IGNORED, AND THE INSTRUCTIONS IMPLICITLY REFERENCE THE VPE CONTAINING THE TC EXECUTING THE MTTR/MFTR INSTRUCTION, I.E. THAT WHICH IS REFERENCED BY THE CPUNUM FIELD OF THE EBASE REGISTER, AS SEEN BY THE INSTRUCTION STREAM. | | | R/W | UNDEFINED |
| TARGTC | 7:0 | TC NUMBER TO BE USED ON MTTR AND MFTR INSTRUCTIONS. | | | R/W | UNDEFINED |
| 0 | 31:29, 24:24, 14, 9:8 | MUST BE WRITTEN AS ZERO; RETURN ZERO ON READ. | | | 0 | 0 |

FIG. 5E

VPECONF0 REGISTER — 505

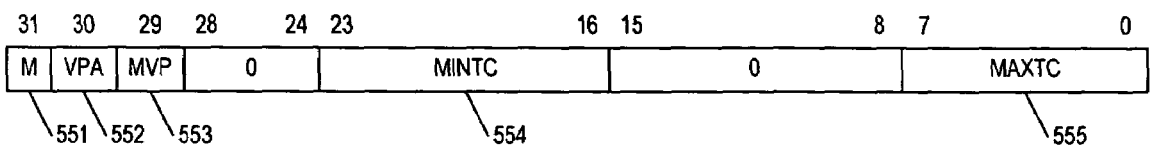

| FIELDS | | DESCRIPTION | READ/ WRITE | RESET STATE |
|---|---|---|---|---|
| NAME | BITS | | | |
| M | 31 | THIS BIT IS RESERVED TO INDICATE THAT A VPECONF1 REGISTER IS PRESENT. IF THE VPECONF1 REGISTER IS NOT IMPLEMENTED, THIS BIT SHOULD READ AS A 0. IF THE VPECONF1 REGISTER IS IMPLEMENTED, THIS BIT SHOULD READ AS A 1. | R | PRESET |
| VPA | 30 | VIRTUAL PROCESSOR ACTIVATED. IF SET, THE VPE WILL SCHEDULE THREADS AND EXECUTE INSTRUCTIONS SO LONG AS THE EVP BIT OF THE MVPCONTROL REGISTER ENABLES MULTI-VPE EXECUTION. | R | PRESET |
| MVP | 29 | MASTER VIRTUAL PROCESSOR. IF SET, THE VPE CAN ACCESS THE REGISTERS OF OTHER VPES OF THE SAME VMP, USING MTTR/MFTR, AND CAN MODIFY THE CONTENTS OF THE MVPCONTROL REGISTER, THUS ACQUIRING THE CAPABILITY TO MANIPULATE AND CONFIGURE OTHER VPES SHARING THE SAME PROCESSOR. | R | PRESET |
| MINTC | 23:16 | MINIMUM VALID TARGTC/CURTC VALUE WITHIN VPE | R | PRESET |
| MAXTC | 7:0 | MAXIMUM VALID TARGTC/CURTC VALUE WITHIN VPE | R | PRESET |
| 0 | 29:24, 15:8 | RESERVED. READS AS ZERO, MUST BE WRITTEN AS ZERO. | R | 0 |

FIG. 5F

VPECONF1 REGISTER — 506

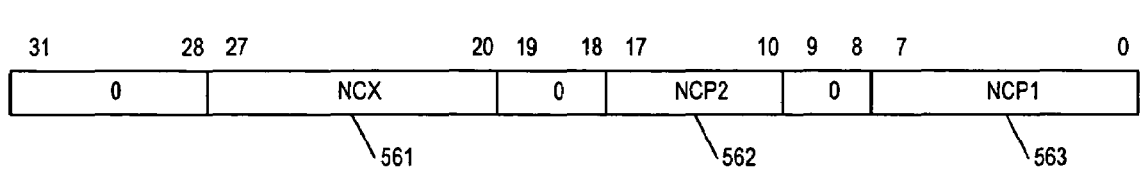

| FIELDS | | DESCRIPTION | READ/ WRITE | RESET STATE |
|---|---|---|---|---|
| NAME | BITS | | | |
| NCX | 27:20 | NUMBER OF COREXTEND(TM) UDI STATE INSTANTIATIONS AVAILABLE, FOR UDI BLOCKS WITH PERSISTENT STATE. | R | PRESET |
| NCP2 | 17:10 | NUMBER OF COPROCESSOR 2 CONTEXTS AVAILABLE. | R | PRESET |
| NCP1 | 7:0 | NUMBER OF COPROCESSOR 1 CONTEXTS AVAILABLE | R | PRESET |
| 0 | 31:28, 19:18, 9:8 | RESERVED. READS AS ZERO, MUST BE WRITTEN AS ZERO. | R | 0 |

FIG. 5G

VPESCHEDULE REGISTER — 592

METHOD FOR DYNAMICALLY CONFIGURING VIRTUAL PROCESSOR RESOURCES

MECHANISMS FOR DYNAMIC CONFIGURATION OF VIRTUAL PROCESSOR RESOURCES

CROSS REFERENCE TO RELATED APPLICATIONS

This application is a continuation-in-part of U.S. application Ser. No. 10/684,350, filed Oct. 10, 2003, now U.S. Pat. No. 7,376,954, issued May 20, 2008, and U.S. application Ser. No. 10/684,348, filed Oct. 10, 2003, currently pending, which are hereby incorporated by reference in their entirety for all purposes. Each of U.S. Pat. No. 7,376,954 and U.S. application Ser. No. 10/684,348 claims the benefit of U.S. Provisional Application No. 60/499,180, filed Aug. 28, 2003; U.S. Provisional Application No. 60/502,358, filed Sep. 12, 2003; and U.S. Provisional Application No. 60/502,359, filed Sep. 12, 2003, which are hereby incorporated by reference in their entirety for all purposes.

Additionally, this application is related to U.S. application Ser. No. 10/929,342, filed Aug. 27, 2004, now U.S. Pat. No. 7,321,965, issued Jan. 22, 2008; U.S. application Ser. No. 10/928,746, filed Aug. 27, 2004, currently pending; and U.S. application Ser. No. 10/929,097, filed Aug. 27, 2004, now U.S. Pat. No. 7,424,599, issued Sep. 9, 2008.

BACKGROUND OF THE INVENTION

1. Field of the Invention

The present invention relates in general to the field of virtual multiprocessors, and in particular to mechanisms that provide for dynamic configuration of resources within a virtual multiprocessor between one or more virtual processing elements.

2. Description of the Related Art

Present day designers employ many techniques to increase microprocessor performance. Most microprocessors operate using a clock signal running at a fixed frequency. Each clock cycle, the circuits of the microprocessor perform their respective functions. According to Hennessy and Patterson, the true measure of a microprocessor's performance is the time required to execute a program or collection of programs. From this perspective, the performance of a microprocessor is a function of its clock frequency, the average number of clock cycles required to execute an instruction (or alternately stated, the average number of instructions executed per clock cycle), and the number of instructions executed in the program or collection of programs. Semiconductor scientists and engineers continue to provide advances in the art that enable microprocessors to run at increasingly faster clock frequencies. These advances predominately enable the reduction of transistor sizes, which results in faster switching times within an integrated circuit designed therefrom. The number of instructions executed is largely fixed by the task to be performed by the program, although it is also affected by the instruction set architecture of the microprocessor. However, large performance increases have been realized by architectural and organizational techniques that improve the instructions per clock cycle, in particular by techniques that allow for parallel execution of instructions (i.e., "parallelism").

One parallelism technique that has improved the instructions per clock cycle of microprocessors, as well as their clock frequency, is pipelining. Pipelining overlaps execution of multiple instructions within pipeline stages of the microprocessor in a manner substantially similar to stages in an assembly line. In an ideal situation, each clock cycle one instruction moves down the pipeline to a new stage, which performs a different function on the instructions. Thus, although each individual instruction takes multiple clock cycles to complete, because the multiple cycles of the individual instructions overlap, the average clocks per instruction is reduced. The performance improvements of pipelining may be realized to the extent that the instructions in the program permit it, namely to the extent that an instruction does not depend upon its predecessors in order to execute and can therefore execute in parallel with its predecessors, which is commonly referred to as instruction-level parallelism. Another way in which instruction-level parallelism is exploited by contemporary microprocessors is the issuing of multiple instructions for execution during the same clock cycle to different functional units, which each perform their directed functions during that clock cycle. A microprocessor that accomplishes instruction-level parallelism in this manner is commonly referred to as a "superscalar" microprocessor.

The parallelism mechanisms discussed above pertain to parallelism at the individual instruction-level. However, the performance improvement that may be achieved through exploitation of instruction-level parallelism is limited. Various constraints imposed by limited instruction-level parallelism and other performance-constraining issues have recently renewed an interest in exploiting parallelism at the level of blocks, or sequences, or streams, or threads of instructions. This level of parallelism is commonly referred to as thread-level parallelism. A thread is simply a sequence, or stream, of program instructions. A multithreaded microprocessor concurrently executes multiple threads according to some scheduling policy that dictates the fetching and issuing of instructions of the various threads, such as interleaved, blocked, or simultaneous multithreading. A multithreaded microprocessor typically allows the multiple threads to share the functional units of the microprocessor (e.g., instruction fetch and decode units, caches, branch prediction units, and load/store, integer, floating-point, SIMD, etc. execution units) in a concurrent fashion. However, multithreaded microprocessors include multiple sets of hardware/firmware resources, or thread contexts, for storing the unique state of each thread to facilitate the ability to quickly switch between threads to fetch and issue instructions. For example, each thread context includes its own program counter for instruction fetching and thread identification information, and typically also includes its own general purpose register set.

One example of a performance-constraining issue addressed by multithreading microprocessors is the fact that accesses to memory outside the microprocessor that must be performed due to a cache miss typically have a relatively long latency. The memory access time of a contemporary microprocessor-based computer system is commonly between one and two orders of magnitude greater than the cache hit access time. Consequently, while the pipeline is stalled waiting for the data from memory, some or all of the pipeline stages of a single-threaded microprocessor may be idle performing no useful work for many clock cycles. Multithreaded microprocessors may alleviate this problem by issuing instructions from other threads during the memory fetch latency, thereby enabling the pipeline stages to make forward progress performing useful work, somewhat analogously to, but at a finer level of granularity than, an operating system performing a task switch in response to a page fault. Other examples of performance-constraining issues are pipeline stalls and their accompanying idle cycles due to a branch misprediction and concomitant pipeline flush, or due to a data dependence, or due to a long latency instruction such as a divide instruction. Again, the ability of a multithreaded microprocessor to issue instructions from other threads to pipeline stages that would otherwise be idle may significantly reduce the time required to execute the program or collection of programs comprising the threads. Another problem, particularly in embedded systems, is the wasted overhead associated with interrupt servicing. Typically, when an input/output device signals an interrupt event to the microprocessor, the microprocessor switches control to an interrupt service routine, which requires saving of the current program state, servicing the interrupt, and restoring the current program state after the interrupt has been serviced. A multithreaded microprocessor provides the ability for event service code to be its own thread having its own thread context. Consequently, in response to the input/output device signaling an event, the microprocessor can quickly—perhaps in a single clock cycle—switch to the event service thread, thereby avoiding incurring the conventional interrupt service routine overhead.

Just as the degree of instruction-level parallelism dictates the extent to which a microprocessor may take advantage of the benefits of pipelining and superscalar instruction issue, the degree of thread-level parallelism dictates the extent to which a microprocessor may take advantage of multithreaded execution. An important characteristic of a thread is its independence of the other threads being executed on the multi-threaded microprocessor. A thread is independent of another thread to the extent its instructions do not depend on instructions in other threads. The independent characteristic of threads enables the microprocessor to execute the instructions of the various threads concurrently. That is, the microprocessor may issue instructions of one thread to execution units without regard to the instructions being issued of other threads. To the extent that the threads access common data, the threads themselves must be programmed to synchronize data accesses with one another to insure proper operation such that the microprocessor instruction issue stage does not need to be concerned with the dependences.

As may be observed from the foregoing, a processor with multiple thread contexts concurrently executing multiple threads may reduce the time required to execute a program or collection of programs comprising the multiple threads. However, the introduction of multiple thread contexts also introduces a new set of problems, particularly for system software, to manage the multiple instruction streams and their associated thread contexts. And the present inventors have noted yet another level that is required for improving the parallelism associated with instruction execution in a microprocessor. In this and related applications, the present inventors address the provision of virtual processing elements within the same microprocessor. Taken to this level, a multi-threaded virtual processing element, in addition to implementing multiple program counters and thread contexts to ensure the effective switching of program threads, implements all of the resources necessary to provide for a single instantiation of a given instruction set and privileged resource architecture that is sufficient to execute a per-processor operating system image. Effectively, a microprocessor that implements N virtual processing elements (i.e., a "virtual multiprocessor" having N virtual processing elements) appears to operating system software as an N-way symmetric multiprocessor. The physical difference between a virtual multiprocessor according to the present invention and a conventional symmetric multiprocessor is that, in addition to sharing memory and some level of connectivity, the virtual processing elements within a virtual multiprocessor also share on-chip resources, or attributes, of the virtual multiprocessor such as, for example, instruction fetch and issue logic; address translation logic (e.g., translation lookaside buffer logic); functional units such as integer units, floating point units, multimedia units, media acceleration units, and SIMD units; and coprocessors. In addition, the virtual processing units must share performance attributes, or utilization aspects (e.g., "bandwidth"), of the virtual multiprocessor, which are determined largely based upon the number of threads that are allocated to each of the virtual processing elements, the extent that the threads associated with one virtual processing element can take priority over the threads associated with other virtual processing elements when execution is required, and the allocation of certain processor-wide resources (e.g., load/store buffers) to the virtual processing elements. For example, consider an embedded system in which two distinct kinds of processing are taking place: real-time compression of audio or video data, and operation of a graphical user interface. Using late 20th century technology, these tasks might be accomplished by using two different processors: a real-time digital signal processor to handle the multimedia data and an interactive processor core which runs a multitasking operating system. Yet, the present invention allows for these two functions to be performed on the same virtual multiprocessor. Two virtual processing elements of the virtual multiprocessor would be employed: one dedicated to performing the multimedia processing tasks, and the other dedicated to performing the user interface tasks. Employing two virtual processing elements solves the problem of the co-existence, or co-instantiation of two different software paradigms, but it does not guarantee the real-time performance requirements in the same way as a dedicated processor, because the multimedia virtual processing element and the user interface virtual processing element must share certain resources within the virtual multiprocessor and the performance of applications executing on a virtual multiprocessor are, as alluded to above, based upon how those resources, or attributes are allocated to each of the virtual processing elements therein.

To fabricate a virtual multiprocessor that has resources precisely tailored to a specific multiprocessing application would be excessively cost-ineffective in a market where multiprocessing applications exhibit a very wide and diverse set of resource requirements. Thus, the present inventor has observed that it is very desirable to provide a virtual multiprocessor that can be employed across this wide range of multiprocessing applications. He has additionally noted that it is desirable that the virtual multiprocessor include mechanisms for configuration of resources to various virtual processing elements therein by software. Such mechanisms should allow the virtual multiprocessor to be configured with one or more virtual processing elements, where each of the virtual processing elements is configured to execute one or more threads. Furthermore, it is desired that the resources be dynamically configurable by trusted virtual processing elements at run-time, and moreover that a mechanism be provided to revoke configuration privileges.

SUMMARY OF THE INVENTION

The present invention, among other applications, is directed to solving the above-noted problems and addresses other problems, disadvantages, and limitations of the prior art. The present invention provides superior mechanisms for dynamically configuring the resources of a virtual multiprocessor. In one embodiment, an apparatus is provided for configuring resources for one or more virtual processing elements in a virtual multiprocessor. The apparatus includes a virtual multiprocessor context, one or more virtual processing element contexts, and configuration logic. The virtual multiprocessor context, prescribes the resources, and controls a configuration state of the virtual multiprocessor. The one or more virtual processing element contexts each exclusively correspond to one of the one or more virtual processing elements. The one or more virtual processing element contexts each have first logic, for prescribing whether the one of the one or more virtual processing elements is permitted to configure the resources; and second logic, for prescribing a subset of the resources that is allocated to said one of the one or more virtual processing elements. The configuration logic is coupled to the virtual multiprocessor context and the one or more virtual processing element contexts. The configuration logic detects whether the one of the one or more virtual processing elements is permitted to configure the resources, updates the virtual multiprocessor context to direct that the virtual multiprocessor enter the configuration state, and configures the resources by updating a prescribed virtual processing element context.

One aspect of the present invention contemplates a resource configuration mechanism, for assigning resources to virtual processing elements within a virtual multiprocessor. The resource configuration mechanism has virtual multiprocessor registers, virtual processing element registers for each of the virtual processing elements, and configuration logic. The virtual multiprocessor registers prescribes the resources, and control a configuration state of the virtual multiprocessor. The virtual processing element registers prescribe whether a corresponding virtual processing element is permitted to assign the resources, and prescribe a subset of the resources that is allocated to the corresponding virtual processing element. The configuration logic is coupled to the virtual multiprocessor registers and the virtual processing element registers. The configuration logic detects whether the corresponding virtual processing element is permitted to assign the resources, updates the virtual multiprocessor registers to direct that the virtual multiprocessor enter the configuration state, and assigns the resources by updating selected ones of the virtual processing element registers.

Another aspect of the present invention comprehends a computer program product for use with a computing device. The computer program product includes a computer usable medium, having computer readable program code embodied in the medium, configured to describe an apparatus for configuring resources for virtual processing elements in a virtual multiprocessor. The computer readable program code has first program code, second program code, and third program code. The first program code describes a virtual multiprocessor context. The virtual multiprocessor context prescribes the resources, and controls a configuration state of the virtual multiprocessor. The second program code describes virtual processing element contexts, each exclusively corresponding to one of the virtual processing elements, and prescribing whether the one of the virtual processing elements is permitted to configure the resources, and prescribing a subset of the resources that is allocated to the one of said virtual processing elements. The third program code describes configuration logic. The configuration logic is coupled to the virtual multiprocessor context and to the virtual processing element contexts. The configuration logic detects whether the one of the virtual processing elements is permitted to configure the resources, updates the virtual multiprocessor context to direct that the virtual multiprocessor enter the configuration state, and configures the resources by updating a prescribed virtual processing element context.

In yet another aspect, the present invention contemplates a computer data signal embodied in a transmission medium. The computer data signal has computer-readable program code that is configured to describe an apparatus for configuring resources for virtual processing elements in a virtual multiprocessor. The computer-readable program code includes first program code, second program code, and third program code. The first program code describes a virtual multiprocessor context, where the virtual multiprocessor context prescribes the resources, and controls a configuration state of the virtual multiprocessor. The second program code describes virtual processing element contexts, each exclusively corresponding to one of the virtual processing elements, and prescribing whether the one of the virtual processing elements is permitted to configure the resources, and prescribing a subset of the resources that is allocated to the one of said virtual processing elements. The third program code describes configuration logic that is coupled to the virtual multiprocessor context and to the virtual processing element contexts. The configuration logic detects whether the one of the virtual processing elements is permitted to configure the resources, updates the virtual multiprocessor context to direct that the virtual multiprocessor enter the configuration state, and configures the resources by updating a prescribed virtual processing element context.

In a further aspect, the present invention embodies a method for configuring resources for virtual processing elements in a virtual multiprocessor. The method includes: via a virtual multiprocessor context, first prescribing the resources, and controlling a configuration state of the virtual multiprocessor; via virtual processing element contexts, each exclusively corresponding to one of the virtual processing elements, second prescribing whether the one of the virtual processing elements is permitted to configure the resources, and third prescribing a subset of the resources that is allocated to the one of the virtual processing elements; and via configuration logic that is coupled to the virtual multiprocessor context and to the virtual processing element contexts, detecting whether the one of the virtual processing elements is permitted to configure the resources, and first updating the virtual multiprocessor context to direct that the virtual multiprocessor enter said configuration state, and configuring the resources by second updating a prescribed virtual processing element context.

In yet another aspect, the present invention comprehends a virtual multiprocessing system. The virtual multiprocessing system has a memory and a virtual multiprocessor. The memory stores program instructions associated with a plurality of program threads. The virtual multiprocessor is coupled to the memory. The virtual multiprocessor executes the program instructions on one or more virtual processing elements configured within the virtual multiprocessor. The virtual multiprocessor has a virtual multiprocessor context that prescribes resources for configuration of the one or more virtual processing elements, and that controls a configuration state of the virtual multiprocessor. Each of the one or more virtual processing elements includes a virtual processing element context and configuration logic. The virtual processing element context prescribes whether the each of the one or more virtual processing elements is permitted to configure the resources, and prescribes a subset of the resources that is allocated to a prescribed one of the one or more virtual processing elements. The configuration logic is coupled to the virtual multiprocessor context and the virtual processing element context. The configuration logic detects whether the each of the one or more virtual processing elements is permitted to configure the resources, updates the virtual multiprocessor context to direct that the virtual multiprocessor enter the configuration state, and configures the resources by updating a prescribed virtual processing element context corresponding to the prescribed one of the one or more virtual processing elements.

BRIEF DESCRIPTION OF THE DRAWINGS

These and other objects, features, and advantages of the present invention will become better understood with regard to the following description, and accompanying drawings where:

FIG. 4 is a table presenting virtual multiprocessing context registers in accordance with an exemplary embodiment of the present invention;

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed. In view of the above background discussion on parallelism and associated multithreading and multiprocessing techniques employed within present day processors, a discussion of the present invention will now be presented with reference to FIGS. 1-7.

Figure 1:
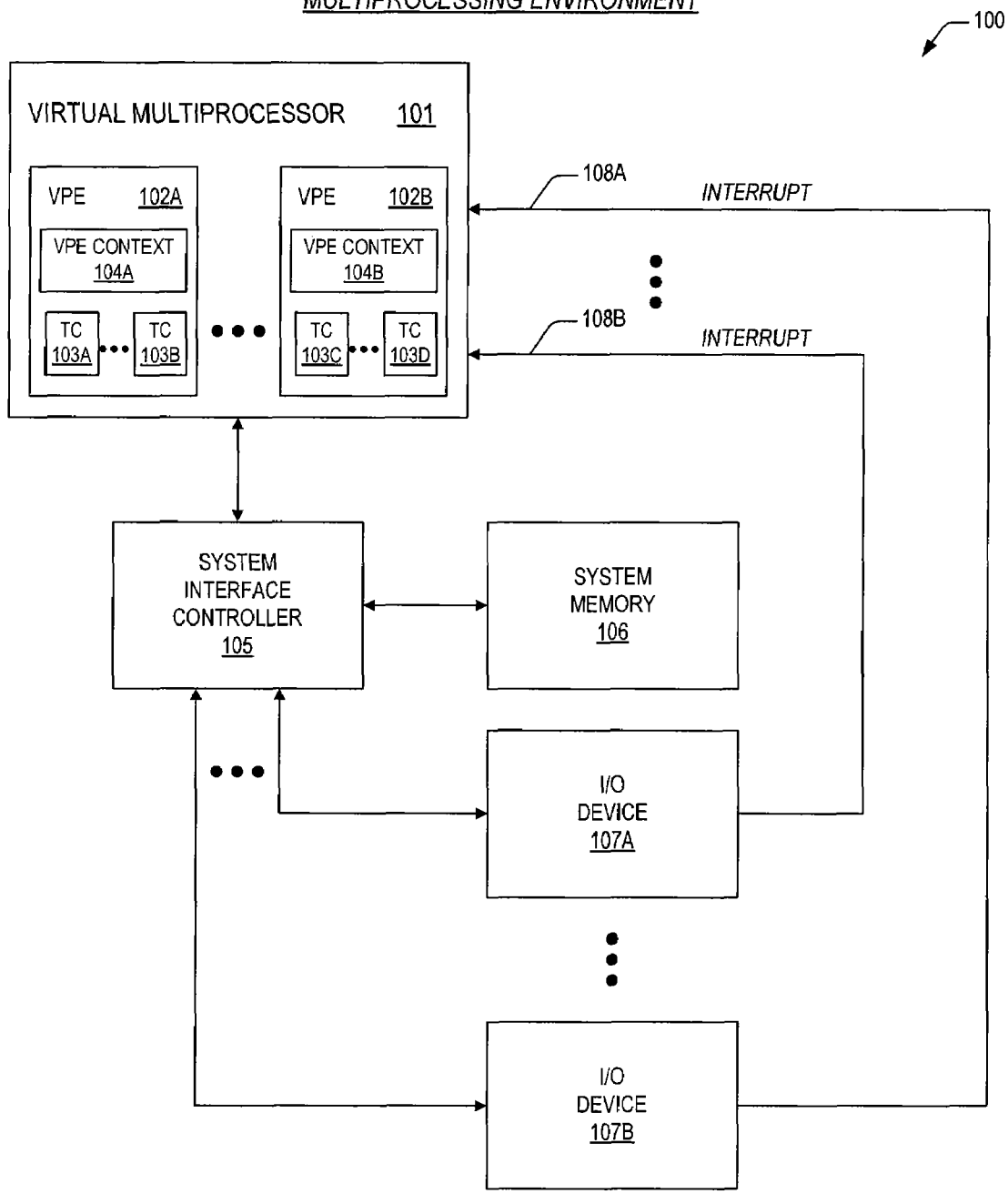
FIG. 1 is a block diagram illustrating a multiprocessing environment according to the present invention.

Referring to FIG. 1, a block diagram illustrating a multiprocessing environment 100 according to the present invention is shown. The multiprocessing environment 100 includes a virtual multiprocessor 101 coupled to a system interface controller 105. The system interface controller 105 is coupled to a system memory 106 and one or more input/output (I/O) devices 107. Each of the I/O devices 107A and 107B provides an interrupt request line 108A and 108B to the virtual multiprocessor 101. The virtual multiprocessor 101 includes one or more virtual processing elements 102A and 102B. Each of the one or more virtual processing elements 102A and 102B has a corresponding virtual processing element context 104A and 104B and one or more corresponding thread contexts 103A, 103B, 103C, and 103D. The multiprocessing environment 100 may be, but is not limited to, a general purpose programmable computer system, server computer, workstation computer, personal computer, notebook computer, personal digital assistant (PDA), or embedded system such as, but not limited to, a network router or switch, printer, mass storage controller, camera, scanner, automobile controller, and the like.

The system memory 106 may be embodied as memory, such as RAM and ROM memory, for storing program instructions for execution on the virtual multiprocessor 101, and for storing data to be processed by the virtual multiprocessor 101 according to the program instructions. The program instructions may comprise one or more program threads that the virtual multiprocessor 101 executes concurrently. A program thread, or thread, comprises a sequence, or stream, of program instructions and associated sequence of state changes in a corresponding virtual processing element 102A or 102B within the virtual multiprocessor 101 that are associated with the execution of the sequence of instructions. Each of thread context 103A, 103B, 103C, and 103D comprises a hardware state necessary to support execution of a corresponding program thread. In one embodiment, each thread context includes a set of general purpose registers, a program counter, and other registers to preserve state of the executing thread such as multiplier state and coprocessor state. Each of the virtual processing elements 102A and 102B provides resources to support an instantiation of a full instruction set architecture and privileged resource architecture that are sufficient to execute a per-processor operating system image. In one embodiment, each of the virtual processing elements 102A and 102B provides resources to support an instantiation of the full MIPS32/MIPS64 instruction set architecture and privileged resource architecture. Each of the virtual processing element contexts 104A and 104B comprises a hardware state necessary to support execution of the threads executing within corresponding virtual processing elements 102A and 102B. In one embodiment, each of the virtual processing element contexts 104A and 104B prescribes resources that are allocated to corresponding virtual processing elements 102A and 102B such as address translation logic resources (e.g., translation lookaside buffer entries), functional units (e.g., integer units, floating point units, multimedia units and media acceleration units, SIMD units, coprocessors), and performance attributes. In a particular embodiment, the performance attributes comprise permission to halt and configure the resources allocated to other virtual processing elements 102A and 102B, the number of and enumeration of threads, enablement/inhibition of corresponding virtual processing elements 102A and 102B, and bandwidth-related resources (e.g., instruction execution bandwidth or priority, load/store bandwidth, etc.) of the virtual multiprocessor 101 that are allocated to corresponding virtual processing elements 102A and 102B. The present invention comprehends a variety of bandwidth allocation techniques to include scheduling hints, execution priority assignment, load/store buffer allocation, and the like.

The system interface controller 105 interfaces with the virtual multiprocessor 101 via a processor bus coupling the virtual multiprocessor 101 to the system interface controller 105. In one embodiment, the system interface controller 105 includes a memory controller for controlling the system memory 106. In one embodiment, the system interface controller 105 includes a local bus interface controller for providing a local bus, such as a PCI bus, to which the I/O devices 107A and 107B are coupled.

The I/O devices 107A and 107B may include, but are not limited to, user input devices such as keyboards, mice, scanners and the like; display devices such as monitors, printers and the like; storage devices such as disk drives, tape drives, optical drives and the like; system peripheral devices such as direct memory access controllers (DMAC), clocks, timers, 1/0 ports and the like; network devices such as media access controllers (MAC) for Ethernet, FibreChannel, Infiniband, or other high-speed network interfaces; data conversion devices such as analog-to-digital (A/D) converters and digital-to-analog converters; and so forth. The I/O devices 107A and 107B generate the interrupt signals 108A and 108B to the virtual multiprocessor 101 to request service. Advantageously, the virtual multiprocessor 101 is capable of concurrently executing multiple program threads for processing the events signified on the interrupt request lines 108A and 108B without requiring the conventional overhead associated with saving the state of the virtual microprocessor 101, transferring control to an interrupt service routine, and restoring state upon completion of the interrupt service routine.

In one embodiment, the virtual multiprocessor 101 provides two distinct, but not mutually-exclusive, multithreading capabilities. First, the virtual multiprocessor comprises one or more virtual processing elements (VPEs) 102A and 102B to support a corresponding one or more logical processor contexts, each of which appears to an operating system as an independent processing element, through the sharing of resources in the virtual multiprocessor 101. To an operating system, a virtual multiprocessor 101 having N VPEs 102A and 102B appears like an N-way symmetric multiprocessor (SMP), which allows existing SMP-capable operating systems to manage the one or more VPEs 102A and 102B. Second, each of VPEs 102A and 102B may also include one or more thread contexts 103A, 103B, 103C, and 103D for simultaneously executing a corresponding one or more program threads. Consequently, the virtual multiprocessor 101 according to the present invention also provides a multithreaded programming model wherein program threads can be created and destroyed without operating system intervention in typical cases, and where system service threads can be scheduled in response to external conditions (e.g., input/output service event signals) with minimized interrupt latency.

In one embodiment, each of the thread contexts 103A, 103B, 103C, and 103D includes one or more storage elements, such as registers or latches, having fields (e.g., bits) therein that describe the state of execution of a corresponding thread. That is, a given thread context 103A, 103B, 103C, and 103D describes the state of its respective thread, which is unique to the thread, rather than the state shared with other threads of execution executing concurrently on virtual processing elements 102A and 102B. A thread—also referred to herein as a program thread, thread of execution, or instruction stream—is a sequence of instructions. Each of the virtual processing elements 102A and 102B is capable of concurrently executing multiple threads. By storing the state of each thread in thread contexts 103A, 103B, 103C, and 103D, each of the virtual processing elements 102A and 102B within the virtual multiprocessor 101 is configured to quickly switch between threads to fetch and issue instructions. Advantageously, the present virtual multiprocessor 101 is configured to execute instructions for moving thread context information between the various thread contexts 103A, 103B, 103C, and 103D, as is described in detail in co-pending U.S. patent application Ser. No. 10/929,097, filed Aug. 27, 2004, now U.S. Pat. No. 7,424,599, issued Sep. 9, 2008, which has herein been incorporated by reference above.

In one embodiment, each of the VPE contexts 104A and 104B includes a collection of storage elements, such as registers or latches, having fields (e.g., bits) therein that describe the state of execution of corresponding VPEs 102A and 102B, and which provide for configuration of the resources for corresponding VPEs 102A and 102B such as, but not limited to, address translation resources, coprocessing resources (e.g. floating point processors, media processors, etc.), thread capacity and enumeration, permission to enable/inhibit execution of specified VPEs 102A and 102B, and permission to configure the resources of specified VPEs 102A and 102B. In one embodiment, VPEs 102A or 102B may configure its own resources by updating its corresponding VPE contexts 104A or 104B. Alternatively, VPEs 102A or 102B may configure the resources of different VPEs 102A or 102B by updating VPE contexts 104A or 104B that correspond to the different VPEs 102A or 102B. Consequently, a virtual multiprocessor 101 with N VPEs 102A and 102B appears to an operating system or other symmetric multiprocessing application as an N-way symmetric multiprocessor. In one embodiment, the VPEs 102A and 102B share particular resources in the virtual multiprocessor 101 such as instruction cache, instruction fetcher, instruction decoder, instruction issuer, instruction scheduler, execution units and coprocessing unit, and data cache, transparently to the operating system. The degree and extent that the resources are shared is prescribed by the VPE contexts 104A and 104B and may be dynamically configured at run time or other times by updating the VPE contexts 104A and 104B. For a given VPE 102A or 102B to configure its own resources or resources that are assigned to a different VPE 102A or 102B, its own VPE context 104A or 104B must prescribe that the given VPE 102A or 102B is permitted to configure resources of the virtual multiprocessor 101, as will be described in more detail below. Accordingly, if the VPE contexts 104A and 104B of given VPEs 102A and 102B indicates that given VPEs 102A and 102B are permitted to configure resources, then given VPEs 102A and 102B may update all VPE contexts 104A and 104B to provide for dynamic resource configuration, including modification of resource configuration permissions, which includes the ability to revoke configuration permissions. In one embodiment, each of VPEs 102A and 102B substantially conforms to a MIPS32 or MIPS64 Instruction Set Architecture (ISA) and a MIPS Privileged Resource Architecture (PRA), and each of the VPE contexts 104A and 104B includes the MIPS PRA Coprocessor 0 and system state necessary to describe an instantiation thereof. In one embodiment, the VPE context 106 includes the VPECONTROL Register 504, VPECONF0 Register 505, VPECONF1 Register 506, and VPESCHEDULE Register 592 of FIGS. 5D-5G described below. In one respect, VPEs 102A and 102B may be viewed as an exception domain. That is, when one of the thread contexts 103A, 103B, 103C, and 103D of VPEs 102A and 102B generates an exception, multithreading is suspended on VPEs 102A or 102B (i.e., only instructions of the instruction stream associated with thread contexts 104A or 104B servicing the exception are fetched and issued), and each VPE contexts 104A and 104B includes the state necessary to service the exception. Once the exception is serviced, the exception handler may selectively re-enable multithreading on VPEs 102A or 102B.

Figure 2:
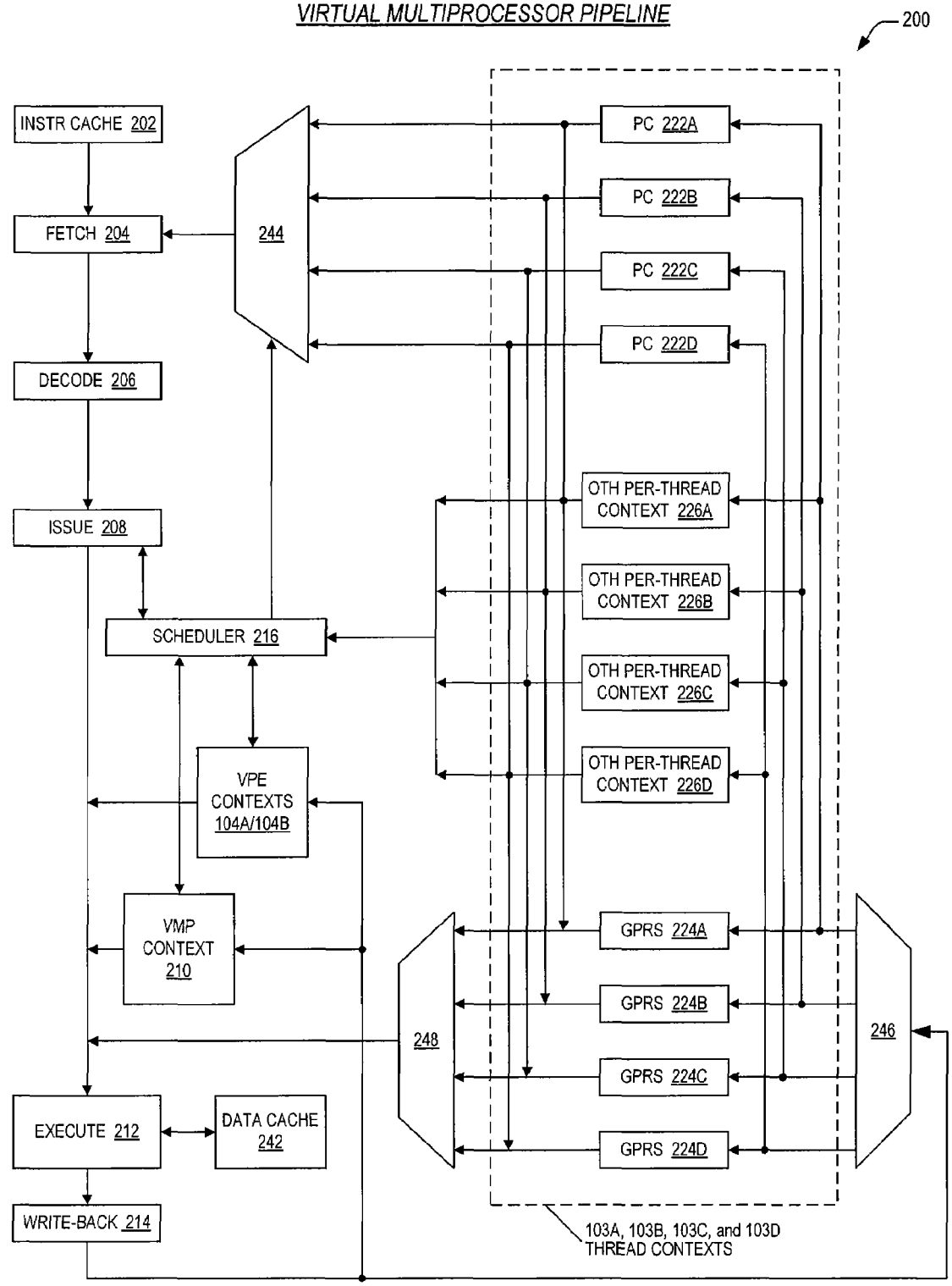
FIG. 2 is a block diagram featuring a virtual multiprocessor pipeline according to the present invention.

Now turning to FIG. 2, a block diagram is presented that illustrates a virtual multiprocessor pipeline 200 within a virtual multiprocessor according to the present invention. The pipeline 200 includes a plurality of pipeline stages and additionally includes one or more thread contexts 103A, 103B, 103C, and 103D. The exemplary embodiment of FIG. 2 shows four thread contexts 103A, 103B, 103C, and 103D. In one embodiment, each thread context 103A, 103B, 103C, and 103D comprises a program counter (PC) 222A, 222B, 222C, or 222D for storing an address for fetching a next instruction in the associated instruction stream, a general purpose register (GPR) set 224A, 224B, 224C, or 224D for storing intermediate execution results of the instruction stream issuing from the thread based on the program counter 222A, 222B, 222C, or 222D value, and other per-thread context 226A, 226B, 226C, or 226D. In one embodiment, the pipeline 200 includes a multiplier unit (not shown), and the other thread context 226A, 226B, 226C, or 226D includes registers for storing results of the multiplier unit specifically associated with multiply instructions in the instruction stream. In one embodiment, the other thread context 226A, 226B, 226C, or 226D includes information for uniquely identifying each thread context 103A, 103B, 103C, and 103D. In one embodiment, the thread identification information includes information for specifying the execution privilege level of the associated thread, such as whether the thread is a kernel, supervisor, or user level thread. In one embodiment, the thread identification information includes information for identifying a task or process comprising the thread. In particular, the task identification information may be used as an address space identifier (ASID) for purposes of translating physical addresses into virtual addresses.

The pipeline 200 includes a scheduler 216 for scheduling execution of the various threads being concurrently executed by the virtual multiprocessor 100. The scheduler 216 is coupled to a VMP context 210, the VPE contexts 104 of FIG. 1 (104A and 104B), and to the other per-thread contexts 226A, 226B, 226C, and 226D. In particular, the scheduler 216 is responsible for scheduling fetching of instructions from the program counters 222A, 222B, 222C, or 222D of the various thread contexts 104A and 104B and for scheduling issuing of the fetched instructions to execution units 212 of the virtual multiprocessor 100, as described below. The scheduler 216 schedules execution of the threads based on a scheduling policy of the virtual multiprocessor 100. The scheduling policy may include, but is not limited to, any of the following scheduling policies. In one embodiment, the scheduler 216 employs a round-robin, or time-division multiplexed, or interleaved, scheduling policy that allocates a predetermined number of clock cycles or instruction issue slots to each ready thread in a rotating order. The round-robin policy is useful in an application in which fairness is important and a minimum quality of service is required for certain threads, such as real-time application program threads. In one embodiment, the scheduler 216 employs a blocking scheduling policy wherein the scheduler 216 continues to schedule fetching and issuing of a currently running thread until an event occurs that blocks further progress of the thread, such as a cache miss, a branch misprediction, a data dependency, or a long latency instruction. In one embodiment, the pipeline 200 comprises a superscalar pipeline that employs multiple execution units 212, and the scheduler 216 schedules the issue of multiple instructions per clock cycle, and in particular, the issue of instructions from multiple threads per clock cycle, commonly referred to as simultaneous multithreading. In another embodiment, the scheduler 216 employs a scheduling policy that utilizes scheduling information provided via the VPE contexts 104A and 104B where the scheduling information indicates bandwidth and/or bandwidth-related resources that are allocated to each of the VPEs 102A and 102B.

The pipeline 200 includes an instruction cache 202 for caching program instructions fetched from a system memory. In one embodiment, the pipeline 200 provides virtual memory capability, and the fetch unit 204 includes a translation lookaside buffer (not shown) for caching physical to virtual memory page translations. In this embodiment, resources (e.g., entries) within the translation look aside buffer are allocated to each of the VPEs 102A and 102B that share the pipeline 200, as prescribed by the VPE contexts 104A and 104B. In one embodiment, each program, or task, executing in the pipeline 200 is assigned a unique task ID, or address space ID (ASID), which is used to perform memory accesses and in particular memory address translations, and thread contexts 103A, 103B, 103C, and 103D also includes storage for an ASID associated with the thread.

The pipeline 200 also includes a fetch unit 204, coupled to the instruction cache 202, for fetching program instructions from the instruction cache 202 and system memory. The fetch unit 204 fetches instructions at an instruction fetch address provided by a multiplexer 244. The multiplexer 244 receives a plurality of instruction fetch addresses from the corresponding plurality of program counters 222A, 222B, 222C, and 222D. Each of the program counters 222A, 222B, 222C, and 222D stores a current instruction fetch address for a different program thread. The embodiment of FIG. 2 illustrates four different program counters 222 associated with four different threads. The multiplexer 244 selects one of the four program counters 222A, 222B, 222C, or 222D based on a selection input provided by the scheduler 216. In one embodiment, the various threads executing on the microprocessor 100 share the fetch unit 204.

The pipeline 200 also includes a decode unit 206, coupled to the fetch unit 204, for decoding program instructions fetched by the fetch unit 204. The decode unit 206 decodes the opcode, operand, and other fields of the instructions. In one embodiment, the various threads executing on the microprocessor 100 share the decode unit 206.

The pipeline 200 also includes execution units 212 for executing instructions. The execution units 212 may include, but are not limited to, one or more integer units for performing integer arithmetic, Boolean operations, shift operations, rotate operations, and the like; floating point units for performing floating point operations; load/store units for performing memory accesses and in particular accesses to a data cache 242 coupled to the execution units 212; multimedia acceleration units for performing multimedia operations, and a branch resolution unit for resolving the outcome and target address of branch instructions. In one embodiment, the data cache 242 includes a translation lookaside buffer for caching physical to virtual memory page translations. In addition to the operands received from the data cache 242, the execution units 212 also receive operands from registers of the general purpose register sets 224A, 224B, 224C, or 224D. In particular, an execution unit 212 receives operands from a register set 224A, 224B, 224C, or 224D of thread contexts 104A and B allocated to the thread to which the instruction belongs. A multiplexer 248 selects operands from the appropriate register set 224 for provision to the execution units 212. In addition, the multiplexer 248 receives data from each of the other per-thread contexts 226A, 226B, 226C, and 226D and program counters 222A, 222B, 222C, and 222D, for selective provision to the execution units 212 based on the thread contexts 104A and 104B of the instruction being executed by the execution unit 212. In one embodiment, the various execution units 212 may concurrently execute instructions from multiple concurrent threads.

The pipeline 200 also includes an instruction issue unit 208, coupled to the scheduler 216 and coupled between the decode unit 206 and the execution units 212, for issuing instructions to the execution units 212 as instructed by the scheduler 216, and in response to information about the instructions decoded by the decode unit 206. In particular, the instruction issue unit 208 insures that instructions are not issued to the execution units 212 if they have data dependencies on other instructions previously issued to the execution units 212. In one embodiment, an instruction queue (not shown) is imposed between the decode unit 206 and the instruction issue unit 208 for buffering instructions awaiting issue to the execution units 212 for reducing the likelihood of starvation of the execution units 212. In one embodiment, the various threads executing in the pipeline 200 share the instruction issue unit 208.

The pipeline 200 also includes a write-back unit 214, coupled to the execution units 212, for writing back results of instructions into the general purpose register sets 224A, 224B, 224C, and 224D, program counters 222A, 222B, 222C, and 222D, and other thread contexts 226A, 226B, 226C, and 226D. A demultiplexer 246 receives the instruction result from the write-back unit 214 and stores the instruction result into appropriate register sets 224A, 224B, 224C, and 224D, program counters 222A, 222B, 222C, and 222D, and other thread contexts 226A, 226B, 226C, and 226D associated with the instruction's thread. The instruction results are also provided for storage into the VPE contexts 104A and 104B and a virtual multiprocessor (VMP) context 210.

In one embodiment The VMP context 210 comprises a collection of storage elements, such as registers or latches, having one of more fields (e.g., bits) in the storage elements that describe the state of execution of the virtual multiprocessor 101. In particular, the VMP context 210 stores state related to global resources of the virtual multiprocessor 101 that are shared among the VPEs 102A and 102B, as described hereinabove. In particular, the VMP context prescribes resources that can be allocated to the VPEs 102A and 102B during configuration and also controls whether the virtual multiprocessor 101 is in a configuration state for configuration of the resources. In one embodiment, the VMP context 210 comprises an MVPCONTROL Register 501, MVPCONF0 Register 502, and MVPCONF1 Register 503 of FIGS. 5A-5C described below.

The particular stages 202, 204, 206, 208, 212, 214 of the pipeline 200 of FIG. 2 are provided to clearly teach the present invention without obfuscating essential aspects. One skilled in the art will appreciate that staging of the pipeline 200 may be modified by increasing or decreasing the number of stages, or by allocating functions differently to stages, to improve performance, without departing from the spirit and scope of the present invention.

Figure 3:
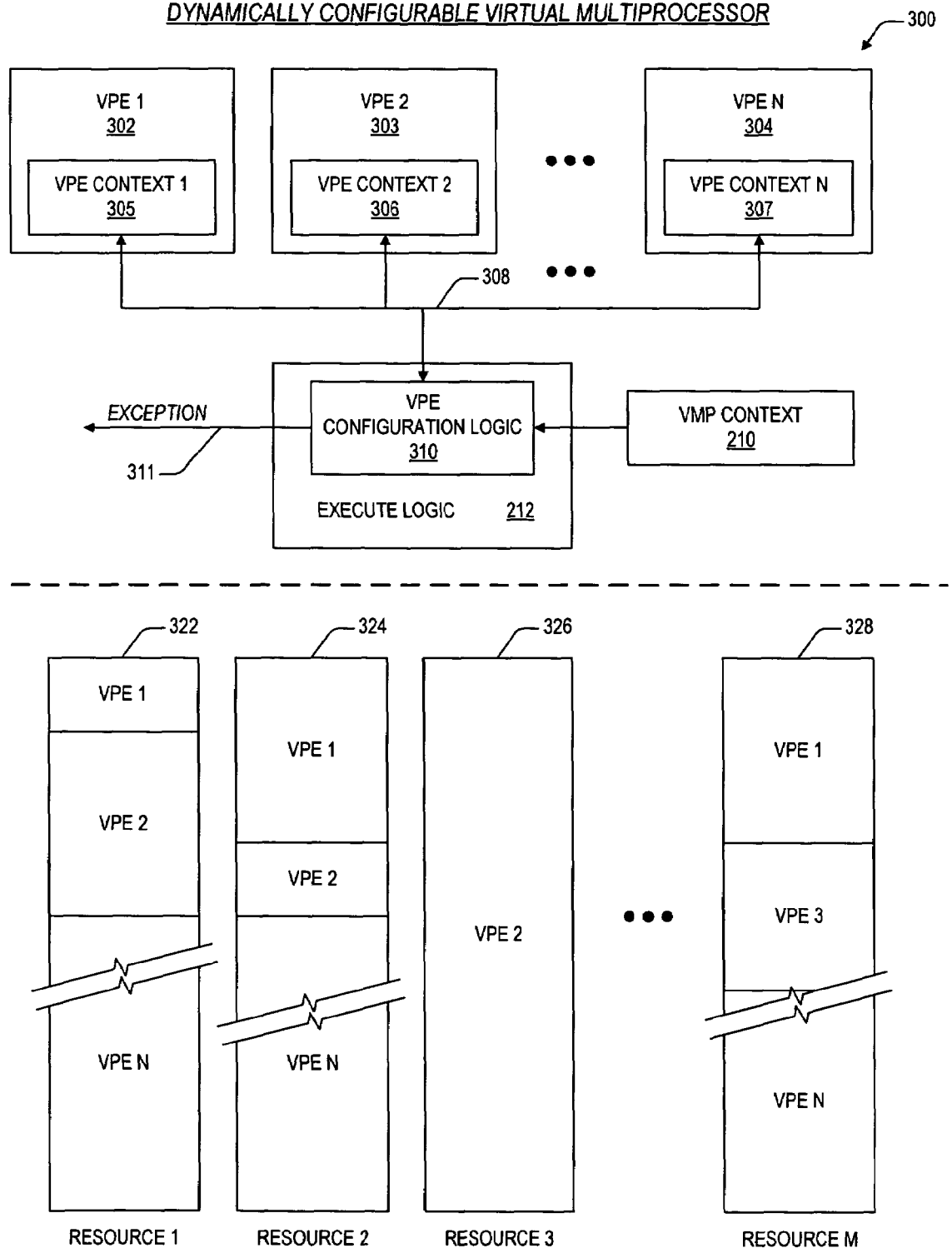
FIG. 3 is a block diagram showing a dynamically configurable virtual multiprocessor according to the present invention.

Referring now to FIG. 3, a block diagram is presented showing a dynamically configurable virtual multiprocessor 300 according to the present invention. The multiprocessor 300 includes one or more VPEs 302-304, enumerated as VPE 1 302, VPE 2 303, through VPE N 304. Each VPE 302-304 has a corresponding VPE context 305-307. The VPEs 302-304 are coupled to the execute logic 212, along with the VMP context 210, as described above with reference to FIG. 2. The execute logic 212 includes VPE configuration logic 310. The VPE configuration logic 310 is coupled to an exception signal 311. Also shown in the block diagram are one or more resources 322, 324, 324, 326, 328 enumerated as RESOURCE 1 322, RESOURCE 2 324, RESOURCE 3 326, through RESOURCE M 328.

In operation, configuration of the resources 322-328 is accomplished by executing a configuration instruction sequence issued by a VPE 302-304 that is permitted to configure the resources 322-328. In one embodiment, permission to configure the resources 322-328 is prescribed by the VPE context 305-307 of the corresponding VPE 302-304. When a configuration instruction sequence is received by the execute logic 212 within the pipeline 200, the VPE configuration logic 310 accesses the VPE context 305-307 that corresponds to the VPE 302-304 whose program thread caused the configuration instruction sequence to be fetched to determine whether the VPE 302-304 is permitted to configure the resources 322-328. If not, then the configuration logic 310 causes the exception signal 311 to be asserted and the configuration instruction sequence is not executed. If the VPE 302-304 is permitted to configure the resources 322-328, then the VPE configuration logic 310 executes the configuration instruction sequence to direct the virtual multiprocessor 300 to enter a configuration state, and to update one or more prescribed VPE contexts 305-307, thus reconfiguring the resources. In one embodiment, the configuration instruction sequence directs the virtual multiprocessor 300 to enter the configuration state by updating the VMP context 210. In one embodiment, the sequence of configuration instructions comprises instructions conforming to the MIPS32/MIPS64 Multithreading (MT) Application Specific Extensions (ASE) architecture.

The block diagram shows a particular embodiment of configured resources 322-328 resulting from execution of the configuration instruction sequence, and diagrammatically illustrating how particular resources 322-328 can be dynamically configured according to the present invention to optimize performance of threads concurrently executing in a given multithreading multiprocessing application. For example, consider that the diagrammatic division of RESOURCE 1 322 corresponds to address translation resources (e.g., translation lookaside buffer entries). From the division shown, it is indicated that VPE 1 302 is assigned a proportion of the address translation resources that is less than those allocated to the remaining VPEs 303-304. Perhaps the threads executing on VPE 1 302 are short and repetitive relative to other threads and thus do not require extensive address translation resources. Consider also that RESOURCE 2 324 represents contexts corresponding to multithreaded coprocessors (e.g., floating point element, media element, SIMD element, etc.). It is illustrated that VPE 2 303, as prescribed within its VPE context 306, is allocated a lesser number of contexts relative to the other VPEs 302, 307, perhaps due to the operations directed by instruction threads issued by VPE 2 303 which do not require extensive coprocessing resources. In addition, consider that RESOURCE 3 326 represents resource configuration permissions. As is diagrammatically represented, only VPE 2 303 is permitted to configure the resources 322-328 in the virtual multiprocessor 300. It is noted that a given VPE 302-304 that has been granted configuration permission (in this case VPE 2 303) may grant configuration permission to other VPEs 302-304, or revoke their configuration permissions, or revoke its own configuration permission. This is accomplished by updating prescribed VPE contexts 305-307 as described herein. Consider that RESOURCE M 328 is a bandwidth resource that allocates bandwidth of the virtual multiprocessor 300 to its VPEs 302-304 in accordance with an implemented scheduling policy as described above. Accordingly, it is diagrammatically represented that each of the exemplary VPEs 302-304 are accorded equal portions of the multiprocessor bandwidth, either via direct execution bandwidth allocation, or by setting execution priorities approximately equal, or by some other technique for prescribing bandwidth or bandwidth-related resources. One such technique for prescribing bandwidth-related resources that is contemplated by the present invention is allocation of load/store bandwidth to the VPEs 302-304. For example, if the number of memory operation buffers (not shown) in the virtual multiprocessor 300 which are shared among the VPEs 302-304 is less than the number of executing threads, then prior to executing the memory operations associated with a thread of a given VPE 302-304, the virtual multiprocessor 300 will evaluate whether or not the given thread should be switched out because such operations would exceed the bandwidth-related resource allocation prescribed for the given VPE 302-304. Such an approach to bandwidth allocation advantageously addresses situations where a small number of threads associated with one VPE 302-304, generate, for example, long sequences of cache misses that would otherwise monopolize the bandwidth-related resources (in this instance, memory operation buffers), thus preventing threads from other VPEs 302-304 from executing. By specifying bandwidth-related resource quotas, such situations are precluded in the virtual multiprocessor 300 according to the present invention.

Now referring to FIG. 4, a table 400 is presented depicting virtual multiprocessing context registers in accordance with an exemplary embodiment of the present invention. The virtual multiprocessing context registers are employed to configure either a virtual multiprocessor context 210 or a virtual processing element context 104, as described above. The virtual multiprocessing context comprises registers MVPCONTROL, MVPCONF0, and MVPCONF1. The virtual processing element context for each VPE within a virtual multiprocessor comprises registers VPECONTROL, VPECONF0, VPECONF1, and VPESCHEDULE. The table 400 shows that the registers comport with the multithreading application specific extensions to the MIPS32/MIPS64 instruction set and privileged resource architecture which assigns a CP0 register number and register select number for to each of the shown registers for accessing contents therein. The structure and contents of the above registers will now be discussed with reference to FIG. 5.

Figure 5C:
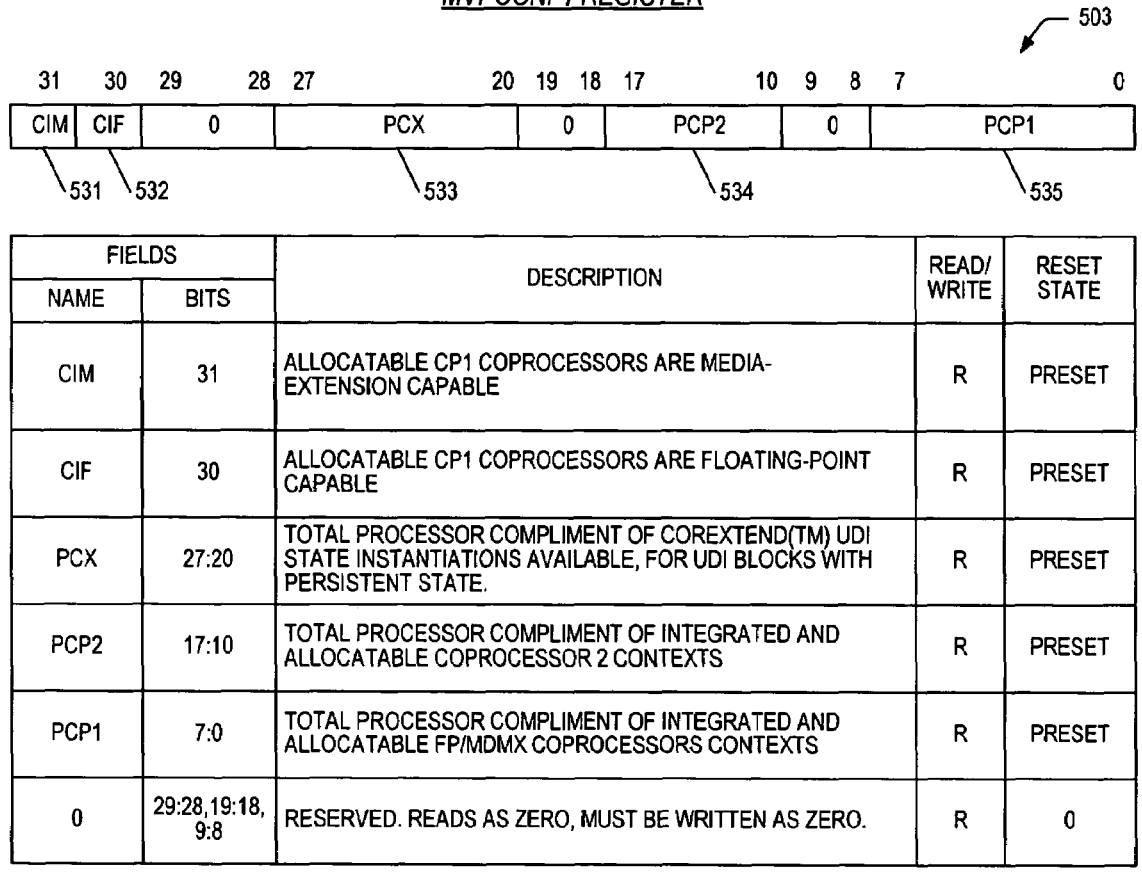
FIG. 5 is a series of block diagrams illustrating exemplary embodiments of each of the virtual multiprocessing context registers of FIG. 4.

FIG. 5 is a series of block diagrams illustrating exemplary embodiments of each of the virtual multiprocessing context registers 501-506, 592 of FIG. 4. FIGS. 5A-5F include an illustration of the fields of the each of the registers and a table describing the various fields. Fields of particular relevance are discussed in more detail herein. Each of the registers illustrated in FIG. 5 may be selectively read and/or written by VPE that has permission to dynamically configure resources, as indicated by the value of its MVP field 553 within its VPECONF0 register 505. Certain fields within the registers 501-506, 592 can be written only by a VPE whose MVP field 553 indicates that it has configuration permission. Otherwise, the certain fields are read only, as controlled by the configuration logic 310.

The MVPCONTROL register 501 has an STLB field 511, a VPC field 512, and an EVP field 513. A VPE 102A or 102B having configuration permission as describe above may update the VPC field 512 and the EVP field 513 to place the virtual multiprocessor 101 in a configuration state for configuration of resources. Clearing the VPC field 512 and setting the EVP field 513 causes new resource values to be latched in the configuration registers 501-506, 592 and for virtual processing to resume. A VPE 102A or B having configuration permission may update the STLB field 511 to cause sharing of address translation resources.

The MVPCONF0 register 502 and the MVPCONF1 register 503 are read-only registers that are read by a VPE 102A or 102B having configuration permission to determine the number and extent of configurable resources that are provided within a given virtual multiprocessor 101. Field TLBS indicates that address translation resources are shamble and that address translation resource sharing may be configured by setting field STLB 511 of the MVPCONTROL register 501. Field PVPE 524 prescribed the total number of VPEs 102A and 102B provided for by the virtual multiprocessor 101. In the embodiment of FIG. 5, up to sixteen VPEs 102A and 102B may be employed. Field PTC 525 indicates the total number of thread contexts 103A, 103B, 103C, and 103D provided for by the virtual multiprocessor 101. In the embodiment shown, up to 256 thread contexts 103A, 103B, 103C, and 103D may be instantiated. Field CIM 531 indicates that allocatable coprocessors are media-extension capable. Field CIF 532 indicates whether allocatable coprocessor are floating point capable. Fields 533-535 indicate the total number of other ISA-specific resources available for allocation to VPEs 102A and B.

Resources are allocated to a particular VPE 104 by writing to its VPE number to field TARGVPE 334 of its VPECONTROL register 504. One embodiment for writing field 334 is via MIPS MTTR and MFTR instructions described above.

The value of field VPA 552 in register VPECONF0 505 is set to enable/disable a designated VPE 102A or 102B. Field MVP 553 is set to confer or revoke resource configuration permissions. Fields MINTC 554 and MAXTC 555 are updated to allocate the number and enumeration of thread contexts 103A, 103B, 103C, and 103D to a designated VPE 102A or 102B. Fields NCX 561, NCP2 562, and NCP1 563 are updated to allocate coprocessor resources to a particular VPE 102A or 102B in a MIPS32/MIPS64 multithreading application specific extension embodiment of the present invention. As noted above, the tables of FIGS. 5E and 5F show that the noted resource allocation fields 552-555, 561-563 are read-only fields. This is true for all VPEs 102A and 102B that do not have resource configuration permission, as indicated by the state of the MVP bit 553 in the VPECONF0 register 505. But for a VPE 102A or 102B that is granted resource configuration permission, the configuration logic 310 enables the noted fields 552-555, 561-563 to be updated (i.e., written).

Register VPESCHEDULE 592 comprises a scheduler hint field 529 that can be updated to configure bandwidth resources across VPEs 102A and 102B in the virtual multiprocessor 101.

Although FIGS. 4 and 5 illustrate an exemplary embodiment of the present invention where certain resources can be dynamically configured in a MIPS32/MIPS64 multithreading application specific extension environment, the present inventor notes that the exemplary embodiment is provided according to a known instruction set architecture to teach aspects of the invention. The present inventor also notes that other architectures are comprehended as well.

Figure 6:
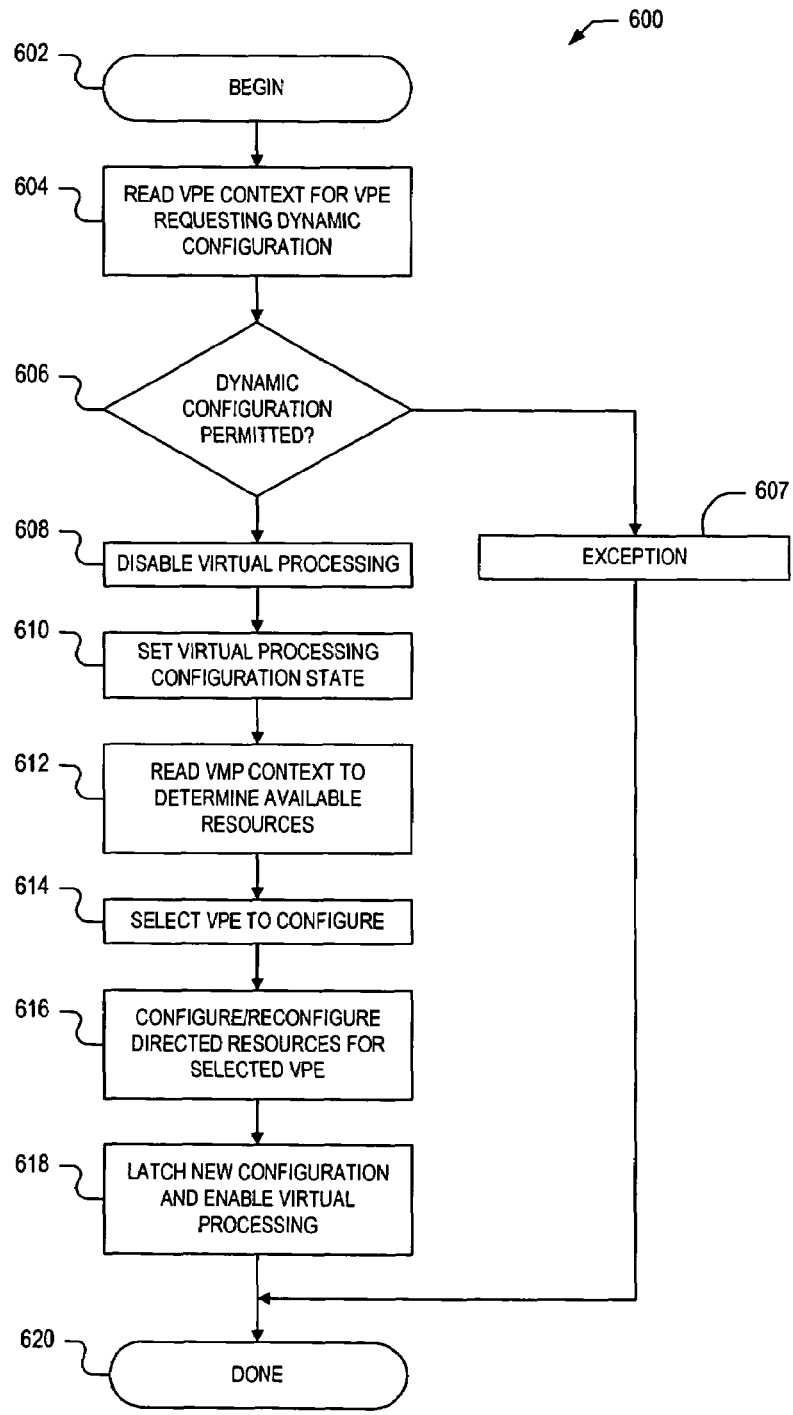
FIG. 6 is a flow chart depicting a method according to the present invention for dynamic configuration of virtual processor resources.

Now turning to FIG. 6, a flow chart 600 is presented depicting a method according to the present invention for dynamic configuration of virtual processor resources. The method begins at block 602 where a VPE according to the present invention desires to dynamically reconfigure resources. Flow then proceeds to block 604. At block 604, the VPE context corresponding to the requesting VPE is read. Flow then proceeds to decision block 606.

At decision block 606, the VPE context is evaluated to determine whether the requesting VPE is permitted to dynamically configure resources in the virtual multiprocessor. If so, then flow proceeds to block 608. If not, then flow proceeds to block 607.

At block 607, since the requesting VPE does not have resource configuration permission, an exception is declared and flow proceeds to block 620.

At block 608, virtual processing within the virtual multiprocessor is disabled to allow for resource configuration. Flow then proceeds to block 610.

At block 610, a configuration state is established in the virtual multiprocessor. Flow then proceeds to block 612.

At block 612, the VMP context within the virtual multiprocessor is accessed to determine what and how many resources are available for configuration. Flow then proceeds to block 614.

At block 614, a target VPE is selected for configuration of its allocated resources. Flow then proceeds to block 616.

At block 616, the resources are configured for the selected VPE by updating its corresponding VPE context. Flow then proceeds to block 618.

At block 618, the new configuration of resources for the selected VPE is latched by exiting the configuration state and virtual processing within the virtual multiprocessor is re-enabled. Flow then proceeds to block 620.

At block 620, the method completes.

Figure 7:
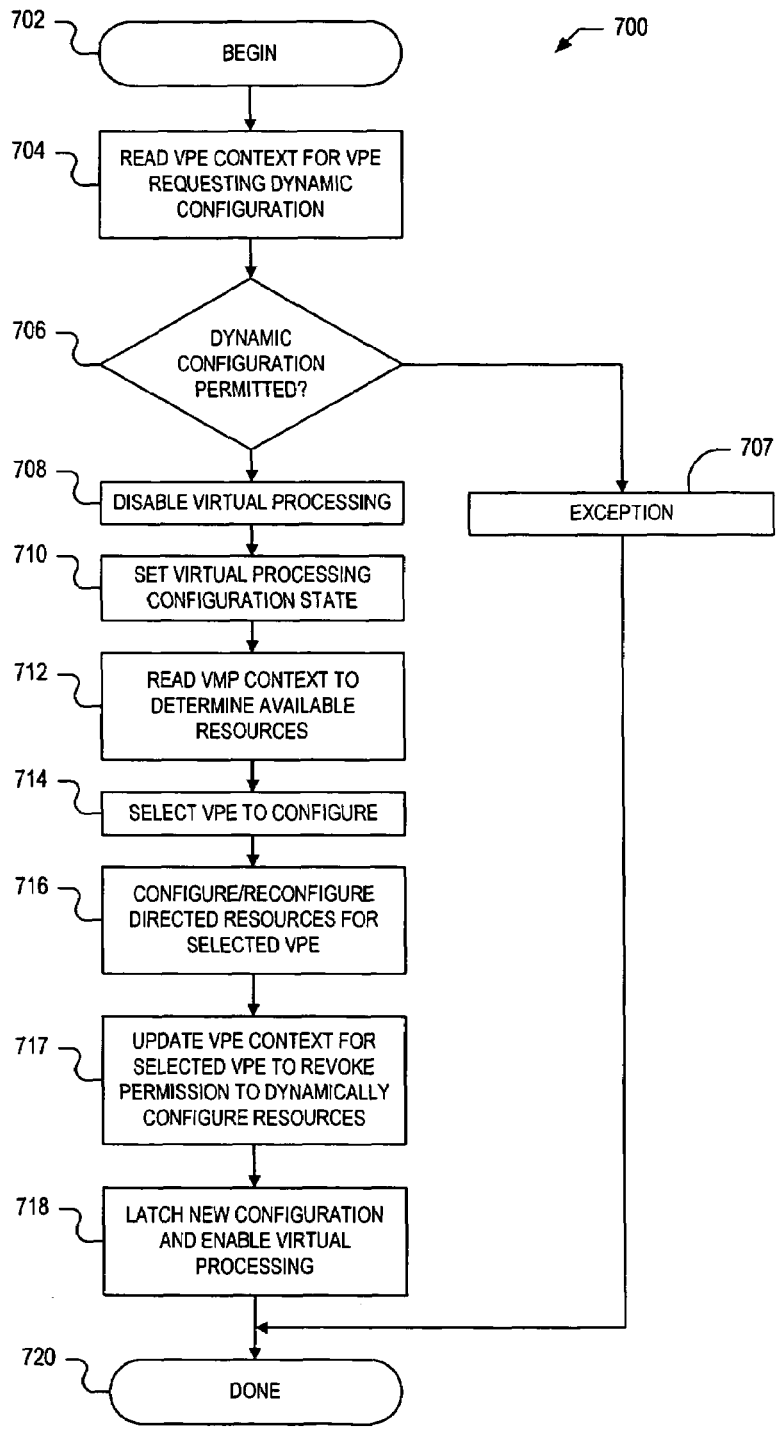
FIG. 7 is a flow chart depicting a revocable method according to the present invention for dynamic configuration of virtual processor resources.

FIG. 7 is a flow chart 700 depicting a revocable method according to the present invention for dynamic configuration of virtual processor resources. All blocks 702-720 of the flow chart 700 of FIG. 7 are equivalent to corresponding blocks 602-620 of the flow chart 600 of FIG. 6, where the hundreds digit is replaced with a 7, except for an additional block 717 wherein the VPE context for the selected VPE is updated to revoke its permission to dynamically configure resources. It is noted that the requesting VPE of block 702 can be the same as the selected VPE of block 717, thus enabling a VPE to revoke its own configuration permission. After latching the new configuration in block 718, the requesting VPE can no longer configure resources.

Although the present invention and its objects, features, and advantages have been described in detail, other embodiments are encompassed by the invention. For example, in addition to implementations of the present invention using hardware, the present invention can be embodied in software (e.g., computer readable code, program code, instructions and/or data) disposed, for example, in a computer usable (e.g., readable) medium. Such software enables the function, fabrication, modeling, simulation, description and/or testing of the apparatus and method described herein. For example, this can be accomplished through the use of general programming languages (e.g., C, C++, JAVA, etc.), GDSII databases, hardware description languages (HDL) including Verilog HDL, VHDL, and so on, or other available programs, databases, and/or circuit (i.e., schematic) capture tools. Such software can be disposed in any known computer usable (e.g., readable) medium including semiconductor memory, magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets. It is understood that the invention can be embodied in software (e.g., in HDL as part of a semiconductor intellectual property core, such as a microprocessor core, or as a system-level design, such as a System on Chip or SOC) and transformed to hardware as part of the production of integrated circuits. Also, the invention may be embodied as a combination of hardware and software.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A hardware apparatus for configuring resources for a plurality of virtual processing elements in a virtual multiprocessor configured to operate on a single microprocessor, the apparatus comprising:
    a virtual multiprocessor, to prescribe the resources, and to control a configuration state of the virtual multiprocessor;
    a plurality of virtual processing element contexts, each exclusively corresponding to one of the plurality of virtual processing elements, said each virtual processing element context comprising:
        first logic, to prescribe whether the virtual processing element that the virtual processing element context corresponds to is permitted to configure the resources; and
        second logic, having contents to prescribe a subset of the resources that is allocated to the virtual processing element that the virtual processing element context corresponds to; and
    configuration logic, coupled to said virtual multiprocessor context and said plurality of virtual processing element contexts, to detect whether a particular one of the plurality of virtual processing elements is permitted to configure the resources, to update said virtual multiprocessor context to direct that the virtual multiprocessor enter said configuration state, and configuring to configure the resources by updating the contents of the second logic of a virtual processing element context corresponding to one of the plurality of virtual processing elements.

2. The hardware apparatus of claim 1, wherein the plurality of virtual processing elements execute concurrently within the virtual multiprocessor, and wherein the virtual multiprocessor appears as a symmetric multiprocessor to a symmetric multiprocessing operating system.

3. The hardware apparatus of claim 1, wherein said each of the plurality of virtual processing elements comprise a plurality of thread contexts that are configured to concurrently execute a plurality of threads.

4. The hardware apparatus of claim 3, wherein each of the plurality of thread contexts share configured resources, wherein said configured resources have been allocated from the resources to a corresponding one of the plurality of virtual processing elements.

5. The hardware apparatus of claim 1, wherein the resources comprise a plurality of attributes of the virtual multiprocessor, and wherein configuration of the resources for a particular virtual processing element determines the manner in which said particular virtual processing element performs relative to all other ones of the plurality of virtual processing elements within the virtual multiprocessor.

6. The hardware apparatus of claim 1, wherein the resources comprise translation look-aside buffer attributes.

7. The hardware apparatus of claim 1, wherein the resources comprise coprocessing attributes.

8. The hardware apparatus of claim 1, wherein the resources comprise floating point processing attributes.

9. The hardware apparatus of claim 1, wherein the resources comprise media acceleration attributes.

10. The hardware apparatus of claim 1, wherein the resources comprise permission to configure the resources.

11. The hardware apparatus of claim 1, wherein the resources comprise thread contexts.

12. The hardware apparatus of claim 1, wherein the resources comprise bandwidth of the virtual multiprocessor.

13. The hardware apparatus of claim 1, wherein the resources comprise virtual processing element enablement.

14. The hardware apparatus of claim 1, wherein each of the plurality of virtual processing elements comprises an instantiation of a MIPS32/MIPS64 instruction and privileged resource architecture.

15. The hardware apparatus of claim 1, wherein said virtual processing element context corresponds to said one of the plurality of virtual processing elements.

16. The hardware apparatus of claim 15, wherein said one of the plurality of virtual processing elements may revoke its own permission to configure the resources.

17. The hardware apparatus of claim 1, wherein said virtual processing element context corresponds to a different one of the plurality of virtual processing elements.

18. The hardware apparatus of claim 17, wherein said one of the plurality of virtual processing elements may revoke the permission to configure the resources for said different one of the mere plurality of virtual processing elements.

19. The hardware apparatus of claim 1, wherein said virtual multiprocessing context comprises a plurality of registers, and wherein said configuration state is controlled by writing a value to a configuration state field therein.

20. The hardware apparatus of claim 1, wherein said first logic comprises a master virtual processor field within said one of the plurality of virtual processor context registers, and wherein a particular value of said master virtual processor field prescribes whether said one of the plurality of virtual processing elements is permitted to configure the resources.

21. The hardware apparatus of claim 1, wherein said second logic comprises a plurality of fields within one of said plurality of virtual processor context registers, and wherein said plurality of fields can be updated only by a given virtual processing element that is permitted to configure the resources.

22. The hardware apparatus of claim 21, wherein, if said given virtual processing element is not permitted to configure the resources, then said configuration logic causes an exception.

23. The hardware apparatus of claim 1, wherein a plurality of program instructions are executed by said one of the plurality of virtual processing elements to establish said configuration state and to configure the resources.

24. A resource configuration hardware apparatus, for assigning resources to a plurality of virtual processing elements within a virtual multiprocessor configured to operate on a single microprocessor, the resource configuration hardware apparatus comprising:
   virtual multiprocessor registers, to prescribe the resources, and to control a configuration state of the virtual multiprocessor;
   for each of the plurality of virtual processing elements, a plurality of virtual processing element registers, to prescribe whether the virtual processing element that the virtual processing element registers correspond to is permitted to assign the resources, and at least one field in the virtual processing element registers to prescribe a subset of the resources that is allocated to the virtual processing element that the virtual processing element registers correspond to; and
   configuration logic, coupled to said virtual multiprocessor registers and said plurality of virtual processing element registers, to detect whether a particular one of the plurality of virtual processing elements is permitted to assign the resources, to update the virtual multiprocessor registers to direct that the virtual multiprocessor enter said configuration state, and to assign the resources by updating at least one of the at least one field in the virtual processing element registers corresponding to one of the plurality of virtual processing elements.

25. The apparatus of claim 24, wherein the resources comprise translation look-aside buffer attributes.

26. The apparatus of claim 24, wherein the resources comprise coprocessing attributes.

27. The apparatus of claim 24, wherein the resources comprise floating point processing attributes.

28. The apparatus of claim 24, wherein the resources comprise media acceleration attributes.

29. The apparatus of claim 24, wherein the resources comprise permission to configure the resources.

30. The apparatus of claim 24, wherein the resources comprise thread contexts.

31. The apparatus of claim 24, wherein the resources comprise bandwidth of the virtual multiprocessor.

32. The apparatus of claim 24, wherein the resources comprise virtual processing element enablement.

33. The apparatus of claim 24, wherein each of the plurality of virtual processing elements comprises an instantiation of a MIPS32/MIPS64 instruction and privileged resource architecture.

34. The apparatus of claim 24, wherein said corresponding virtual processing element may revoke its own permission to assign the resources.

35. The apparatus of claim 24, wherein said corresponding one of the plurality of virtual processing-elements may revoke the permission to configure the resources for a different one of the plurality of virtual processing elements.

36. A computer program product for use with a computing device, the computer program product comprising:
   a computer readable storage medium, having computer readable program code embodied in said medium, configured to describe an apparatus for configuring resources for a plurality of virtual processing elements in a virtual multiprocessor configured to operate on single microprocessor, said computer readable program code comprising:
   first program code, configured to describe a virtual multiprocessor context, said virtual multiprocessor context prescribing said resources, and controlling a configuration state of said virtual multiprocessor;
   second program code, configured to describe a plurality of virtual processing element contexts, each exclusively corresponding to one of the plurality of said virtual processing elements, and prescribing whether said one of the plurality of said virtual processing elements is permitted to configure said resources, and at least one field in the virtual processing element context prescribing a subset of said resources that is allocated to said one of the plurality of said virtual processing elements; and
   third program code, configured to describe configuration logic, said configuration logic being coupled to said virtual multiprocessor context and to said plurality of virtual processing element contexts, said configuration logic detecting whether said one of the plurality of said virtual processing elements is permitted to configure said resources, updating said virtual multiprocessor context to direct that said virtual multiprocessor enter said configuration state, and configuring said resources by updating at least one of the at least one field in a virtual processing element context corresponding to one of the plurality of virtual processing elements.

37. The computer program product as recited in claim 36, wherein said resources comprise one or more attributes of said virtual multiprocessor, and wherein configuration of said resources for said prescribed virtual processing element determines the manner in which said prescribed virtual processing element performs relative to all other ones of said plurality of virtual processing elements within said virtual multiprocessor.

38. The computer program product of claim 36, wherein said resources comprise translation look-aside buffer attributes.

39. The computer program product of claim 36, wherein said resources comprise coprocessing attributes.

40. The computer program product of claim 36, wherein said resources comprise floating point processing attributes.

41. The computer program product of claim 36, wherein said resources comprise media acceleration attributes.

42. The computer program product of claim 36, wherein said resources comprise permission to configure said resources.

43. The computer program product of claim 36, wherein said resources comprise thread contexts.

44. The computer program product of claim 36, wherein said resources comprise bandwidth of said virtual multiprocessor.

45. The computer program product of claim 36, wherein said resources comprise virtual processing element enablement.

46. The computer program product of claim 36, wherein each of said plurality of virtual processing elements comprises an instantiation of a MIPS32/MIPS64 instruction and privileged resource architecture.

47. A method for configuring resources for a plurality of virtual processing elements in a virtual multiprocessor configured to operate on single microprocessor, the method comprising:
via a virtual multiprocessor context, prescribing the resources and controlling a configuration state of the virtual multiprocessor;
via a plurality of virtual processing element contexts, each exclusively corresponding to one of the plurality of virtual processing elements, prescribing whether the one of the plurality of virtual processing elements is permitted to configure the resources, and at least one field in a virtual processing element context prescribing a subset of the resources that is allocated to the one of the plurality of virtual processing elements; and
via configuration logic that is coupled to the virtual multiprocessor context and to the plurality of virtual processing element contexts, detecting whether the one of the plurality of virtual processing elements is permitted to configure the resources, and updating the virtual multiprocessor context to direct that the virtual multiprocessor enter said configuration state, and configuring the resources by updating at least one of the at least one field in a virtual processing element context corresponding to one of the plurality of virtual processing elements.

48. The method of claim 47, wherein said second updating comprises:
allocating one or more attributes of the virtual multiprocessor.

49. The method of claim 48, wherein said allocating comprises:
assigning translation look-aside buffer attributes.

50. The method of claim 48, wherein said allocating comprises:
assigning coprocessing attributes.

51. The method of claim 48, wherein said allocating comprises:
assigning floating point processing attributes.

52. The method of claim 48, wherein said allocating comprises:
assigning media acceleration attributes.

53. The method of claim 48, wherein said allocating comprises:
assigning permission to configure the resources.

54. The method of claim 48, wherein said allocating comprises:
assigning thread contexts.

55. The method of claim 48, wherein said allocating comprises:
assigning bandwidth of the virtual multiprocessor.

56. The method of claim 48, wherein said allocating comprises:
enabling a given virtual processing element.

57. The method of claim 47, wherein each of the virtual processing elements comprises an instantiation of a MIPS32/MIPS64 instruction and privileged resource architecture.

58. A virtual multiprocessing system, comprising:
a memory, configured to store program instructions associated with a plurality of program threads; and
a virtual multiprocessor on a single microprocessor, coupled to said memory, configured to execute said program instructions on a plurality of virtual processing elements configured within said virtual multiprocessor, wherein said virtual multiprocessor has a virtual multiprocessor context that prescribes resources for configuration of said plurality of virtual processing elements, and that controls a configuration state of said virtual multiprocessor, wherein each of said plurality of virtual processing elements comprise:
a virtual processing element context, to prescribe whether said each of said plurality of virtual processing elements is permitted to configure said resources, and at least one field in the virtual processing element context to prescribe a subset of said resources that is allocated to the virtual processing element that the virtual processing element context corresponds to; and
configuration logic, coupled to said virtual multiprocessor context and said virtual processing element context, to detect whether said each of said plurality of virtual processing elements is permitted to configure said resources, to update said virtual multiprocessor context to direct that said virtual multiprocessor enter said configuration state, and to configure said resources by updating at least one of the at least one field in a virtual processing element context corresponding to one of said plurality of virtual processing elements.

* * * * *